(12) United States Patent
Magnusson et al.

(10) Patent No.: US 9,896,037 B2
(45) Date of Patent: Feb. 20, 2018

(54) SKI CARRIER CLAMP

(71) Applicant: Thule Sweden AB, Hillerstorp (SE)

(72) Inventors: Karl-Johan Magnusson, Hillerstorp (SE); Jan Adler, Skillingaryd (SE); Anders Nilvius, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/475,698

(22) Filed: Mar. 31, 2017

(65) Prior Publication Data
US 2017/0203700 A1   Jul. 20, 2017

Related U.S. Application Data

(63) Continuation of application No. 14/979,204, filed on Dec. 22, 2015, now Pat. No. 9,649,988.

(30) Foreign Application Priority Data

Dec. 30, 2014  (EP) .................................... 14200627
Dec. 30, 2014  (EP) .................................... 14200631

(51) Int. Cl.
*A47F 7/00*   (2006.01)
*B60R 9/12*   (2006.01)
*A63C 11/02*  (2006.01)

(52) U.S. Cl.
CPC ................ *B60R 9/12* (2013.01); *A63C 11/02* (2013.01)

(58) Field of Classification Search
CPC ...... B60W 3/00; A63C 11/221; A63C 11/222; A63C 11/227; A63C 11/228
See application file for complete search history.

(56) References Cited

U.S. PATENT DOCUMENTS 3,601,294 A   8/1971  Gjesdahl
4,867,362 A   9/1989  Finnegan et al.
(Continued)

FOREIGN PATENT DOCUMENTS

DE   88 13 793   3/1989
EP   0 487 131   5/1992
(Continued)

OTHER PUBLICATIONS

European Search Report for European Application No. EP 14200627.9, European Patent Office, Munich, Germany, dated Jun. 12, 2015, 6 pages.
(Continued)

*Primary Examiner* — John D Walters
*Assistant Examiner* — James J Triggs
(74) *Attorney, Agent, or Firm* — Sterne, Kessler, Goldstein & Fox P.L.L.C.

(57) ABSTRACT

A ski carrier clamp mountable on a cross bar of a vehicle roof carrier includes an elongate base part having a first end portion and a second end portion, an elongate top part having a first end portion and a second end portion, and a hinge mechanism having a guiding portion coupled to the elongate base part and a guided element slidably disposed in the guiding portion. The hinge mechanism couples the first end portion of the elongate base part to the first end portion of the elongate top part. The first end portion of the elongate base part and the first end portion of the elongate top part are configured to move with respect to each other.

20 Claims, 13 Drawing Sheets

(56) References Cited

U.S. PATENT DOCUMENTS

| | | | | | |
|---|---|---|---|---|---|
| 5,456,397 | A | * | 10/1995 | Pedrini | ............... B60R 9/12 224/316 |
| 7,611,035 | B2 | * | 11/2009 | Settelmayer | ......... B60R 9/12 211/70.5 |
| 2007/0235489 | A1 | * | 10/2007 | Jeli | ................. B60R 9/12 224/558 |

FOREIGN PATENT DOCUMENTS

| | | |
|---|---|---|
| WO | WO 91/14599 | 10/1991 |
| WO | WO 2012/016170 | 2/2012 |

OTHER PUBLICATIONS

European Search Report for European Application No. EP 14200631.1, European Patent Office, Munich, Germany, dated Jun. 16, 2015, 7 pages.

* cited by examiner

SKI CARRIER CLAMP

CROSS-REFERENCE TO RELATED APPLICATIONS

This application is a Continuation application of U.S. application Ser. No. 14/979,204, filed Dec. 22, 2015, which is incorporated by reference herein in its entirety.

BACKGROUND

The present subject matter relates to a ski carrier clamp mountable on a cross bar of a vehicle roof carrier.

Vehicle roof carrier systems for transporting winter sport gear have become increasingly popular. Such carrier systems typically comprise cross bars onto which ski carrier clamps can be mounted for fixing the winter sport gear to the vehicle roof carrier system. Known prior art ski carrier clamps essentially comprise an elongate base part and an elongate top part hingedly coupled to the elongate base part. In a locked condition, the elongate base part and the elongate top part extend substantially parallel and allow clamping of winter sport gear between the same. In order to insert winter sport gear into the ski carrier clamp, the elongate top part is rotated into an open position about a hinge. After that, the winter sport gear to be transported, a pair of skis, for example, is placed on an upper surface of the elongate base part and the elongate top part is brought into a closed position in which it is interlocked with the elongate base part. By this, the winter sport gear to be transported is fixedly held between the elongate base part and the elongate top part.

The above mentioned prior art ski carrier clamps have the following drawbacks.

First of all, the prior art ski carrier clamps comprise a certain height and consequently a comparatively large surface oriented in the driving direction of the vehicle. Therefore, the wind resistance of such prior art ski carrier clamps is comparatively large.

Another drawback of the prior art ski carrier clamps resides in the mounting of the same on the cross bars of a vehicle roof carrier. In known mounting solutions of the prior art ski carrier clamps, the ski carrier clamps are mounted on the cross bars by means of screws which need to be fixed in the elongate base part of the ski carrier clamps. In order to access the mounting areas provided for that purpose on the elongate base part, it is necessary to easily access these portions for mounting purposes. On the upper side of the elongate base part, flexible members are typically provided in order to provide a flexible support for the winter sport gear to be transported. According to the prior art solutions, in order to provide access to cross bar attachment screws, the flexible members provided on the elongate base part need to be specifically shaped or provided with recesses or no flexible member is provided at all in these portions leading to a smaller supporting length. In this connection, known prior art ski carrier clamps have two portions for accessing the cross bar attachment screws located on both sides of the flexible member provided thereon. That leads to a configuration in which the screws are very close to the ends of the ski carrier clamp making it difficult to operate the same and, furthermore, the flexible members provided on the elongated base part cannot extend over the entire length of the elongate base part leading to a loss of usable supporting surface.

A further drawback of the prior art ski carrier clamps is the inferior behavior in situations, in which strong forces occur, for example in crash situations.

It is the object of the invention to further develop a ski carrier clamp such that the above mentioned drawbacks are overcome.

SUMMARY

According to a first aspect, the present subject matter relates to a ski carrier clamp mountable on a cross bar of a vehicle roof carrier.

The ski carrier clamp comprises an elongate base part carrying a first flexible clamp member extending in the longitudinal direction of the elongate base part.

The elongate base part can comprise an extruded profile which is preferably made of aluminum. The first flexible clamp member can be made of a deformable material, rubber, for instance. The longitudinal direction of the elongate base part typically corresponds to the longitudinal direction in which the cross bars of vehicle roof carriers extend. Consequently, in case, the ski carrier clamp is mounted on the cross bar of a vehicle roof carrier, the longitudinal direction of the elongate base part corresponds to a direction in which the cross bar extends. In other words, the longitudinal direction of the elongate base part shall be the direction of greatest extension of the elongate base part.

Furthermore, the ski carrier clamp comprises an elongate top part having a second flexible clamp member extending in the longitudinal direction of the elongate top part. Thus, when the ski carrier clamp is mounted on the cross bar of a vehicle roof carrier, the elongate top part is also arranged thereon so as to extend in the direction of the cross bar.

Generally, extending in the longitudinal direction of the respective elongate part means that the respective flexible clamp member comprises a shape which extends in the main extension direction of the elongate parts.

According to the first aspect, the elongate top part is moveably coupled to the elongate base part so that the second flexible clamp member is moveable with respect to the first flexible clamp member. In other words, the distance between the elongate top part and the elongate base part can be varied so as to provide a sufficient space for loading the goods to be transported into the ski carrier clamp.

Furthermore, according to the first aspect, the first flexible clamp member and the second flexible clamp member are arranged such that at least portions thereof are able to laterally pass each other when the elongate base part and the elongate top part are moved towards each other. In the present case, laterally refers to a direction of the ski carrier clamp which is substantially perpendicular to the longitudinal direction of the elongate parts and in practical use corresponds to the longitudinal direction of a vehicle on which such a system is mounted.

Preferably, a substantial portion of the first and/or second flexible clamp members are offset in a transverse direction of the elongate base part and the elongate top part, respectively. In the present case, the lateral direction and the transverse direction of the elongate base part and the elongate top part is to be understood equally and both directions preferably correspond to a horizontal direction when the ski carrier clamp is mounted on a vehicle roof.

For example, offset in a transverse direction can mean that the centers of the flexible clamp members are offset with respect to each other. On the other hand, offset in a transverse direction could also mean that the centers of gravity of the flexible clamp members are offset with respect to each other.

Preferably, a dimension of the first and second flexible clamp members in a direction facing away from the elongate base and top parts on which they are respectively mounted is greatest in the area of the lateral ends of the elongate base and top parts.

Preferably, an overall outer contour of a cross section in a direction perpendicular to the longitudinal directions of at least one of the flexible clamp members in combination with the respective elongate part on which it is carried has an asymmetric shape. For example, the height of the flexible clamp members can vary in the direction perpendicular to the longitudinal directions of the clamp members. In this connection, the asymmetric shape of the above described outer contour preferably arises from an asymmetry of the flexible clamp members. That is, it is possible to provide elongate parts having a symmetric shape and providing thereon flexible clamp members having an asymmetric shape resulting in an overall outer contour with an asymmetric shape. It is to be noted that the asymmetry is preferably achieved by providing a specific overall shape. That is, small local protrusions or indentations in profiles are preferably not considered as rendering a shape asymmetric in the sense of the present subject matter.

Preferably, the first flexible clamp member comprises a first base portion adapted to contact the elongate base part and a first protruding portion arranged on and protruding from the first base portion and/or the second flexible clamp member comprises a second base portion adapted to contact the elongate top part and a second protruding portion arranged on and protruding from the second base portion. For example, the base portion of each of the flexible clamp members can be considered as a respective portion facing the elongate parts. The base portions can comprise specific shapes which allow for mounting the same on the respective clamp member. For example, the base portion can comprise protrusions which are provided for an engagement with corresponding recesses formed in the elongate base part or the elongate top part. These protrusions can be formed as a latching hook allowing to clip the clamp members to the respective elongate parts. It is also possible to form the base portions with a recess into which a corresponding protrusion provided on the elongate parts can engage for mounting the same thereto. The protruding portions are arranged on the base portions and protrude from the same.

Preferably, the first protruding portion and/or the second protruding portion comprise a laterally outer wall provided in the area of the lateral end of the elongate base part and the elongate top part, respectively, the laterally outer wall preferably extending substantially perpendicular with respect to an extension direction of the first base portion and the second base portion, respectively, and preferably comprising a greater wall thickness than other walls of the respective flexible clamp member. The laterally outer wall can be reinforced by the provision of a greater thickness for instance. Since the laterally outer wall on one side of the ski carrier clamp faces the incoming wind when the ski carrier clamp is mounted on a vehicle, providing such a reinforced laterally outer wall has the beneficial effect that a deformation is prevented thereby reducing noise generation, for instance.

Preferably, the first protruding portion and the second protruding portion are formed in a similar shape, preferably with a cross section having the shape of a truncated triangle, a frustoconical cross section or an essentially triangular cross section. In case, both protruding portions are provided with a similar shape, both protruding portions comprise substantially the same deformation characteristics. Accordingly, when a winter sport gear is clamped between the first and second flexible clamp members, the protruding portions of the same are deformed in a similar manner.

Preferably, the first and second flexible clamp members are arranged on the elongate base part and the elongate top part, respectively, in an inversed manner. Since the protruding portions of the first and second flexible clamp members are formed in a similar shape, inversely arranging the same on the respective elongate parts leads to a configuration in which the protruding portions can be nested in case the flexible clamp members are moved towards each other. In other words, such a configuration allows to bring the flexible clamp members very close to each other without deforming the same, so that the overall height of the ski carrier clamp can be reduced in an unloaded condition. It is even possible to use identical flexible members as the first and second flexible members and to arrange them in an inversed manner. By this, the production costs can be reduced while the beneficial effect is still maintained.

According to a preferable embodiment of the present subject matter, at least one protruding portion comprises an interior structure which in cross section comprises at least two hollow spaces and at least one interior wall separating the hollow spaces. Such a construction has the effect that the flexible clamp member can be deformed to a greater extent.

The at least one interior wall and the hollow spaces can form a deformation pattern setting the deformation characteristics of the flexible clamp members. For example, the deformation pattern can be designed such that the laterally outer walls of the protruding portion bulge laterally outward when the protruding portion is compressed in a direction substantially perpendicular to the base portion. Different deformation patterns are possible. For example, it is possible to use patterns in which the interior walls meet at a common point. The deformation characteristic can for example be influenced by using different wall thicknesses for the interior walls or to provide interior walls with a varying wall thickness. According to a preferable construction, the ski carrier clamp comprises only two flexible clamp members. Such a construction enables a good compressibility as it is possible for each laterally outer wall to bulge in the lateral outward direction since no further flexible clamp member is provided there. Therefore, the laterally outer walls are free to deform and are not hindered by any further element.

The flexible clamp members can comprise two interior support walls intersecting each other substantially midways. Furthermore, in case multiple interior walls are used, one or more of the walls can have a reduced thickness compared to other interior walls.

Preferably, the flexible clamp members have heights greater than the heights of the elongate base and top part. Also, the protruding portions can have height which is greater than the width of the base portions of the respective flexible clamp members.

The flexible clamp members can have a shape and can be arranged such that the flexible clamp members can contact each other but cannot contact the opposite elongate part. More precisely, each flexible clamp member is in contact with no other elongate part than the respective elongate part on which it is carried. Accordingly, the first and second flexible clamp members can be arranged such that in case the ski carrier clamp is closed, the first flexible clamp member contacts the second flexible clamp member only and does not contact the elongate top part and the second flexible clamp member contacts the first flexible clamp member only and does not contact the elongate base part.

According to a second aspect of the present subject matter, an elongate base part for a ski carrier clamp is provided, wherein the elongate base part preferably comprises a mounting recess for accommodating a mounting means for mounting the elongate base part to a cross bar of a vehicle roof carrier.

Furthermore, the elongate base part can comprise a mounting structure for coupling a first flexible clamp member to the elongate base part such that the first flexible clamp member is moveable between a non-access position in which the first flexible clamp member obstructs access to the mounting recess and an access position in which access to the mounting recess is possible.

The mounting recess can be in a form of a groove extending substantially along the entire elongate base parte in its longitudinal direction. Preferably, the mounting recess comprises a dimension allowing to accommodate the mounting means for mounting the elongate base part to a cross bar of a vehicle roof carrier therein. The mounting means can, for example, comprise different elements of a screw mechanism including a screw head. Instead of a screw head, a tensioning lever coupled to a threaded section of a tensioning screw can be provided as the mounting means in the mounting recess as well. In this case, the mounting recess can have a dimension which is smaller than the dimension of such a tensioning lever so that in an untensioned state, the tensioning lever protrudes beyond the upper end of the mounting recess and fully accommodates the tensioning lever when the tensioning lever is in a tensioning position. The tensioning lever can be connected to a shaft having a T-shaped free end which can be accommodated in a corresponding groove formed in the cross bar of the vehicle roof carrier, for instance. The mounting structure can have any shape allowing the above described movement of the flexible clamp member. In this connection, it is to be noted that the flexible clamp member can be coupled to the elongate base part along a substantial or even the entire length of the elongate base part. Furthermore, the coupling can be effected permanently, for example, by soldering, gluing, and heat bonding the flexible clamp member to the base part at least at a portion thereof, or by a mechanical releasable connection, such as screwing.

Preferably, the mounting structure comprises an attaching recess for fixedly coupling a mounting portion of the first flexible clamp member to the elongate base part, wherein the attaching recess preferably extends in the longitudinal direction of the elongate base part.

The first flexible clamp member can be hingedly coupled, preferably, pivotally coupled to the elongate base part at a mounting portion thereof and can be moveable from the non-access position into the access position by a swiveling movement about the mounting portion.

The first flexible clamp member can be, at least, partially flexibly deformed upon movement from the use position to the mounting position, preferably, at least at a deformation portion thereof, wherein the deformation portion allows a defined movement of the first flexible clamp member. For example, the deformation portion can be a weakened portion, e.g. a portion with reduced thickness. Preferably, the deformation portion is located close to the mounting portion.

Furthermore, the first flexible clamp member can further comprise an engaging portion releasably engageable with an engaging means of the elongate base part, wherein the engaging portion is preferably formed as an engaging hook and the engaging means is preferably formed as an engaging recess for lockably receiving the engaging portion. Preferably, the first and second flexible clamp members are integrally formed.

According to a third aspect of the present subject matter, a ski carrier clamp as described above is suitably combined with an elongate base part as described before.

According to a fourth aspect of the present subject matter, a ski carrier clamp mountable on a cross bar of a vehicle roof carrier is provided, wherein the ski carrier clamp comprises an elongate base part and an elongate top part as well as a hinge mechanism for coupling the elongate base part and the elongate top part. More precisely, a first end portion of the elongate base part is hingedly coupled to a first end portion of the elongate top part by means of the hinge mechanism.

The hinge mechanism can comprise a guiding portion in which a guided element is slidably guided such that the first end portion of the elongate top part and the first end portion of the elongate base part are moveable with respect to each other. The guided element can comprise an outer shape which is non-circular, e.g. a polygonal shape, in order to prevent a rotation of the guided element in the guiding portion. The guided element can comprise a guiding groove into which a protrusion provided in the guiding portion can engage for limiting a sliding movement of the guided element. The end wall of such a guiding groove can act as a stop against which a side wall of the protrusion can abut.

Preferably, the first end portion of the elongate top part and the first end portion of the elongate base part are moveable with respect to each other in a direction substantially perpendicular to the longitudinal direction of the elongate base part. In an alternative, both end portions can be movable in a direction which is inclined with respect to the longitudinal direction of the elongate base part. Furthermore, it is possible to guide the guided element on a path which is at least partially curved.

The guided element can be moveable between a retracted position, in which the first end portion and the second end portion are closest to each other, and a deployed position and the guided element can by biased towards the retracted position by means of a biasing means.

The biasing means can be a spring accommodated in a recess of the guided element and cooperating with an abutment portion of the guiding portion such that it is compressed upon movement of the guided element towards the deployed position.

The guided element can comprise a supporting portion for hingedly supporting a supported element about a hinge axis wherein the supported element can be the elongate base part or the elongate top part.

The ski carrier can furthermore comprise an urging means, preferably a spring, for exerting an urging force on the supported element for urging the supported element about the hinge axis.

The urging means can be force transmittingly and slidably supported on a supporting surface of the guiding portion at a first section thereof and can be force transmittingly connected to the supported element at a second section thereof such that a force received by the guided element from the urging means is minimized.

The urging means can be a torsion spring wound around the hinge axis and can comprise a first free end slidably accommodated in the guiding portion and a second end fixedly coupled to the supported element. Preferably, the first free end of the torsion spring is not in contact with the guided element. For that, the guiding portion can comprise separate chambers, one for guiding the guided element and one for guiding the first free end. By this, a spring force is transferred directly to the guiding portion and not onto the guided element thereby leading to a reduction of skewing of the guided element with respect to the guiding portion. Consequently, the slidability of the guided element in the guiding portion is enhanced.

According to a fifth aspect of the present subject matter, a ski carrier clamp mountable on a cross bar of a vehicle roof carrier is provided, in which the ski carrier clamp comprises an elongate base part and an elongate top part, wherein a first end portion of the elongate base part is hingedly coupled to a first end portion of the elongate top part by means of a hinge mechanism.

Preferably the hinge mechanism is a hinge mechanism as described with respect to the other aspects according to the present subject matter.

The second end portion of the elongate base part can be releasably lockable to a second end portion of the elongate top part by means of a locking mechanism. Preferably, the locking mechanism comprises a flexible locking wire fixedly coupled to one of the elongate base part and the elongate top part for direct force transmission at a coupling portion thereof. Preferably, the flexible locking wire is directly attached to the portion of the elongate base part or elongate top part on which the flexible clamp members are carried. Such a portion can be an extruded aluminum profile. Furthermore, the flexible locking wire is engageable with a locking portion of the other one of the elongate top part and the elongate base part, respectively, at an engaging portion thereof.

The flexible locking wire can be a locking spring which is pretensioned so as to bias the engaging portion in a locking direction. Accordingly, the locking wire can have two functions, namely a locking function and a spring function.

The locking portion can comprise one or multiple recesses for accommodating the engaging portion. Furthermore, the locking portion is preferably made of metal and can be directly attached to the elongate base part and the elongate top part, respectively. This allows for a direct force transfer from the locking portion to the part to which it is coupled. Accordingly, when the ski carrier clamp is locked, forces between the elongate top part and the elongate base part are transferred via strong elements, preferably metal elements rendering the overall construction more resistant in crash situations allowing to pass more strict standard tests, e.g. according to DIN standard in which the ski carrier clamps loaded with 120% of the admissible weight is launched against a deformable barrier at a speed of 30 km/h. With the present construction, the detachment of the loaded goods, which is not allowed, can be prevented under the above test conditions allowing such a ski carrier clamp to pass the high demands in car load security tests.

The ski carrier clamp can further comprise a release member for moving the engaging portion in a disengaging direction. The release member can be arranged rotatably about an axis, wherein the locking wire can be wound around the axis at a coil portion thereof.

The release member can further comprise a supporting section which, at least, partially supports the flexible wire, wherein the supporting section can extend in a direction radially from the axis such that the flexible wire is, at least, partially supported between the coil portion and the engaging portion. Preferably, the supporting section comprises a groove for accommodating the flexible wire.

The elongate base part and the elongate top part can comprise hollow profiles and the coupling portion can be fixedly held against an inner wall of one of the hollow profiles, preferably over a length of at least 20 mm.

Furthermore, a ski carrier clamp is provided which is structured according to the ski carrier clamps as described before and which comprises a hinge mechanism as described above.

According to a further aspect of the present subject-matter, a ski carrier clamp mountable on a cross bar of a vehicle roof carrier is disclosed, the ski carrier clamp comprising an elongate base part carrying a first flexible clamp member extending in the longitudinal direction of the elongate base part, and an elongate top part having a second flexible clamp member extending in the longitudinal direction of the elongate top part. The elongate top part is movably coupled to the elongate base part so that the second flexible clamp member is movable with respect to the first flexible clamp member. Each of the first flexible clamp member and the second flexible clamp member can comprise an overlapping portion and a non-overlapping portion. The overlapping portions can be arranged for laterally passing each other upon moving the elongate base part and the elongate top part towards each other.

The overlapping portion and the non-overlapping portion can be arranged on opposite sides on each of the first and second flexible clamp members.

The non-overlapping portions of the first and second flexible clamp members can be arranged on sides of the first and second flexible clamp members which are oriented away from each other.

DETAILED DESCRIPTION

Figure 1:
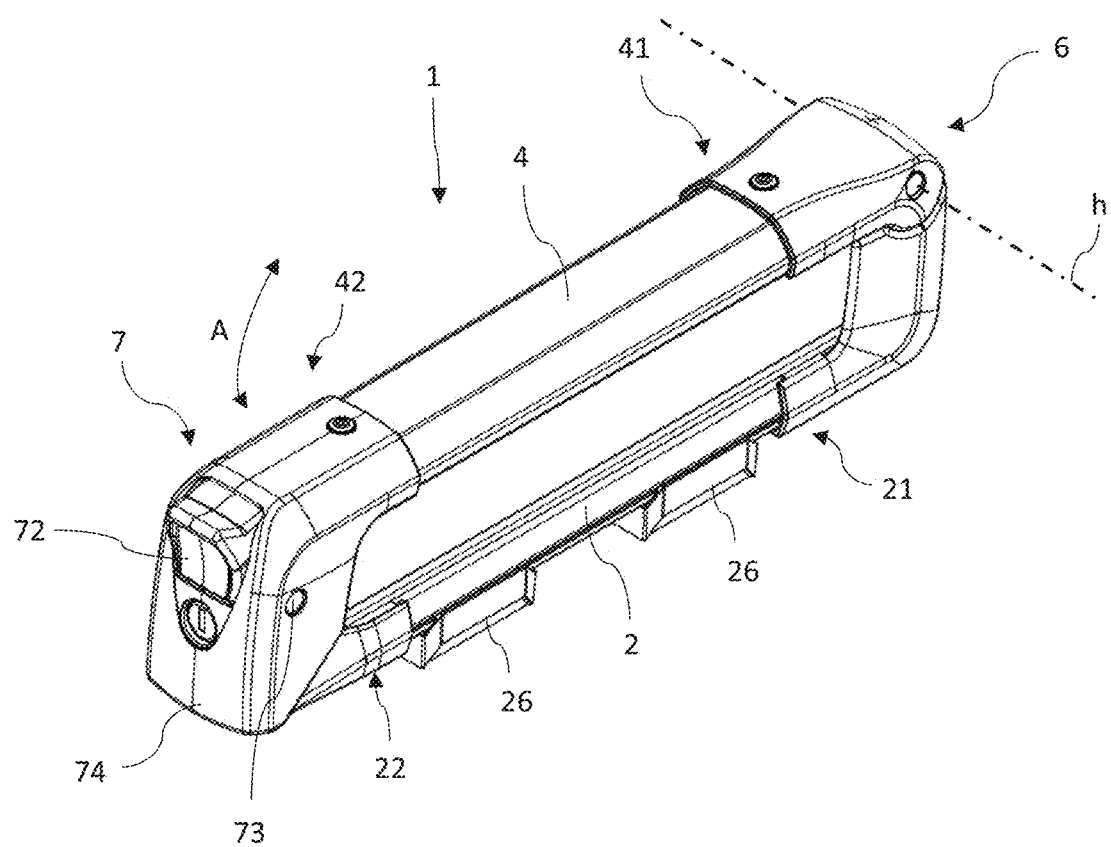
FIG. 1 shows a general construction of a ski carrier clamp.

In the following, different embodiments of the present subject matter will be described. It is noted, that the drawings show different embodiments as explained below. However, the subject matter shall not be limited to the embodiments as explained below. Rather, alternative modifications which are not shown in the drawings but are specified in the description shall also form part of the scope of the present subject matter. In the following embodiments, same reference signs are used in the figures so as to denote same components although different aspects or embodiments are described.

FIG. 1 shows a general construction of a ski carrier clamp 1 comprising an elongate base part 2 which can also be referred to as lower clamp portion and an elongate top part 4 which can also be referred to as upper clamp portion. Both parts or portions are connected to each other by means of a hinge mechanism 6 such that the elongate top part 4 is moveable with respect to the elongate base part 2. More precisely, the elongate base part 2 is connected to the hinge mechanism 6 at a first end 21 thereof, and the elongate top part 4 is connected to the hinge mechanism 6 at a first end 41 thereof. By this, the elongate top part 4 is hingedly arranged with respect to the elongate base part 2 and can perform a rotary movement about a hinge axis h, as is exemplified in FIG. 1 by means of arrow A. Accordingly, the elongate top part 4 can be moved into a condition in which the ski carrier clamp 1 is open and can be brought in a condition in which the ski carrier clamp 1 is closed. In FIG. 1, the closed condition of the ski carrier clamp 1 is shown.

On the side of the ski carrier clamp 1 opposite to the side at which the hinge mechanism 6 is provided, a locking mechanism 7 is arranged for releasably locking the second ends 22, 42 of the elongate base part 2 and the elongate top part 4, respectively. Accordingly, the ski carrier clamp 1 can be locked in the closed condition as shown in FIG. 1.

The locking mechanism 7 according to the present configuration comprises an operating member 72 which in the present case is an operating push button. In case the operating member 72 is pushed, the locking mechanism 7 is released allowing a movement of the elongate top part 4. However, the locking mechanism is not limited to a construction using the push button as an operating member. As an alternative, it is possible, to use other operating members as long as it is possible to release the locking of the locking mechanism. As an example, the operating member could also be realized with a construction in which the operating member is pulled in order to release the locking.

As is further shown in FIG. 1, two mounting portions 26 are provided on the lower side of the ski carrier clamp 1. The mounting portions 26 are provided for mounting the ski carrier clamp 1 onto a cross bar of a vehicle roof carrier (not shown). The mounting portions 26 can have a shape allowing a secure fixation to the cross bars of the vehicle roof carrier, for example a shape at least partially following the outer contour of the cross bars. Furthermore, the mounting portions 26 can comprise a specific height for providing a greater distance between a vehicle roof and the ski carrier clamp 1, thereby preventing a contact between the winter sport equipment to be transported in the ski carrier clamp 1 and the vehicle roof in order to avoid damages to the vehicle roof and to allow the transportation of skis or snowboards with their binding facing towards the vehicle roof. The mounting portions are not necessary for the embodiments as described below but can be used in the same for additional usability of the ski carrier clamp 1.

First Embodiment

According to a first embodiment, a ski carrier clamp 1 is provided comprising a lower clamp portion 2 embodying an elongate base part and an upper clamp portion 4 embodying an elongate top part like in the ski carrier clamp as described above with respect to FIG. 1. It is to be noted that in FIG. 1, a hinge mechanism 6 is shown allowing a rotational movement of the elongate top part 4 about the hinge axis h.

However, for the first embodiment, the structure of the hinge mechanism is not crucial and a different mechanism can be used allowing a movement of the elongate top part 4 with respect to the elongate base part 2.

In the ski carrier clamp 1 according to the first embodiment, the elongate base part 2 and the elongate top part 4 are provided with respective flexible clamp members 3 and 5. The first flexible clamp member 3 is provided on the elongate base part 2 and serves as a support on which the winter sport gear to be transported can be supported. In order to fix the winter sport gear in the ski carrier clamp 1, the elongate top part 4 is pushed downwards in the direction of the elongate base part 2 such that the winter sport gear to be transported is contacted from above by the second flexible clamp member 5 mounted on the lower side of the elongate top part 4. By this, the winter sport gear is fixedly clamped and held between the first and the second flexible members 3 and 5.

The basic concept of the ski carrier clamp according to the first embodiment resides in that the first flexible clamp member 3 and the second flexible clamp member 5 are arranged such that at least portions thereof are able to laterally pass each other upon moving the elongate base part and the elongate top part towards each other. This can be achieved in different ways as is shown in FIGS. 4, 5, 6, 7, 8, 13 and 14.

FIGS. 4 to 8 are schematic drawings showing exemplary outlines of profiles of an elongate base part 2 carrying a flexible clamp member 3 and of an elongate top part 4 carrying a flexible clamp member 5 as seen in cross section in a direction perpendicular to the longitudinal direction of the ski carrier clamp 1.

Figure 4:
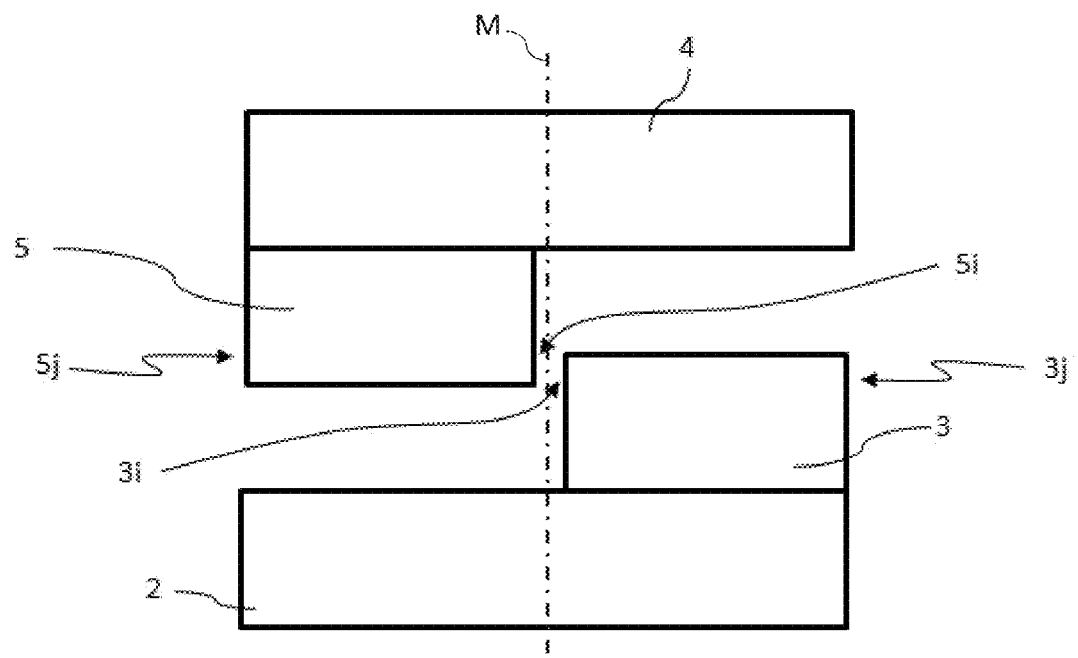
FIGS. 4 to 8 show schematic drawings of exemplary outlines of profiles of an elongate base part carrying a flexible clamp member and of an elongate top part carrying a flexible clamp member as seen in cross section in a direction perpendicular to the longitudinal direction of the ski carrier clamp.

FIG. 4 shows a construction in which the flexible clamp members comprise a rectangular shape and comprise essentially the same dimensions. Both flexible clamp members 3, 5 are offset with respect to a middle plane M extending in the longitudinal direction of the ski carrier clamp 1 as shown by the vertical dashed line in FIG. 4. In this embodiment, the flexible clamp members 3, 5 are offset by the same amount meaning that the distance between them and the middle plane M is substantially the same. Due to this construction, the flexible clamp members can laterally pass each other as is indicated in FIG. 4 in which portions of the flexible members are already located horizontally next to each other. By this, it is possible to bring the elongate top part 4 and the elongate base part 2 close to each other when no goods to be transported are arranged between the flexible members. Accordingly, the height of the ski carrier clamp can be considerably reduced in an unloaded state compared to prior art ski carrier clamps.

With reference to FIG. 4, an alternative definition of the ability of the flexible clamp members to at least partially laterally pass each other for some specific shapes will be described. That is, the first flexible clamp member 2 and the second flexible clamp member 4 can be described as having an overlapping portion 3i, 5i and a non-overlapping portion 3j, 5j and that the overlapping portions 3i, 5i are arranged for laterally passing each other upon moving the elongate base part 2 and the elongate top part 4 towards each other. Such a definition is possible for simple shapes of the flexible clamp members as shown in FIGS. 4 to 8, for instance. Preferably, the overlapping portion the non-overlapping portion of each flexible member are arranged on opposite sides on each of the first and second flexible clamp members 3, 5. According to a preferable modification, the non-overlapping portions 3j, 5j of the first and second flexible clamp members 3, 5 are arranged on sides of the first and second flexible clamp members 3, 5 which are oriented away from each other. In other words, when viewed from the side, the flexible clamp members are arranged such that only one side of each flexible clamp member is obstructed by the other flexible clamp member and the laterally outer sides, i.e. the non-overlapping portions, are visible when viewed from the respective side of the ski carrier clamp.

Figure 5:
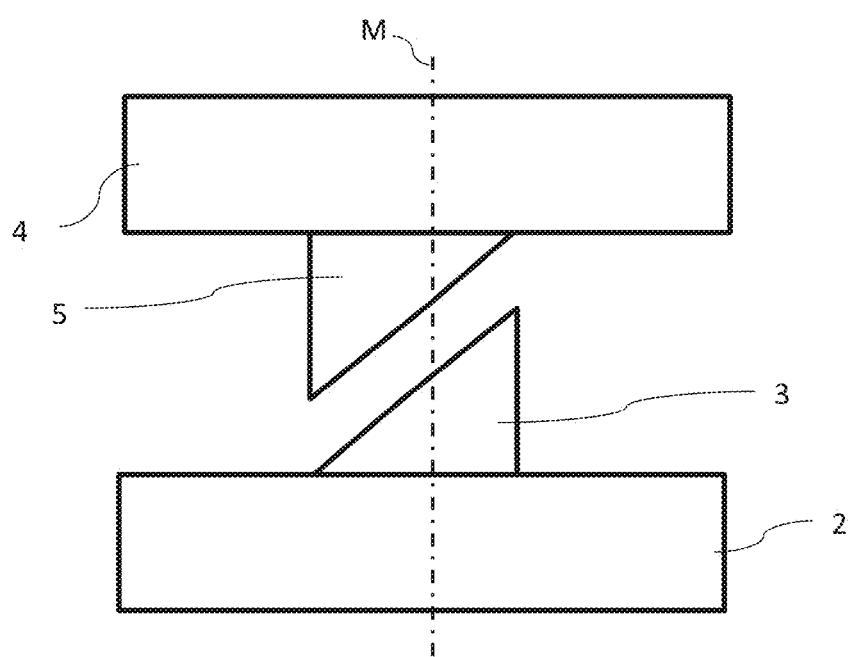

FIG. 5 shows an alternative construction of the flexible clamp members 3, 5 in which portions of the same laterally pass each other upon closing the ski carrier clamp 1 in an unloaded state. In this modification, the flexible clamp members 3, 5 are triangularly shaped with their respective highest portion being arranged on the lateral ends of the flexible clamp members 3, 5 and with their inclined surfaces facing towards each other. Furthermore, the flexible clamp members 3, 5 are arranged such that their inclined surfaces can contact each other when the elongate base part 2 and the elongate top part 4 are brought close to each other. Accordingly, it is possible to bring the upper clamp member 4 closer to the lower clamp member 2 when the ski carrier clamp is in an unloaded condition in which portions of the flexible clamp members can laterally pass each other.

Figure 6:
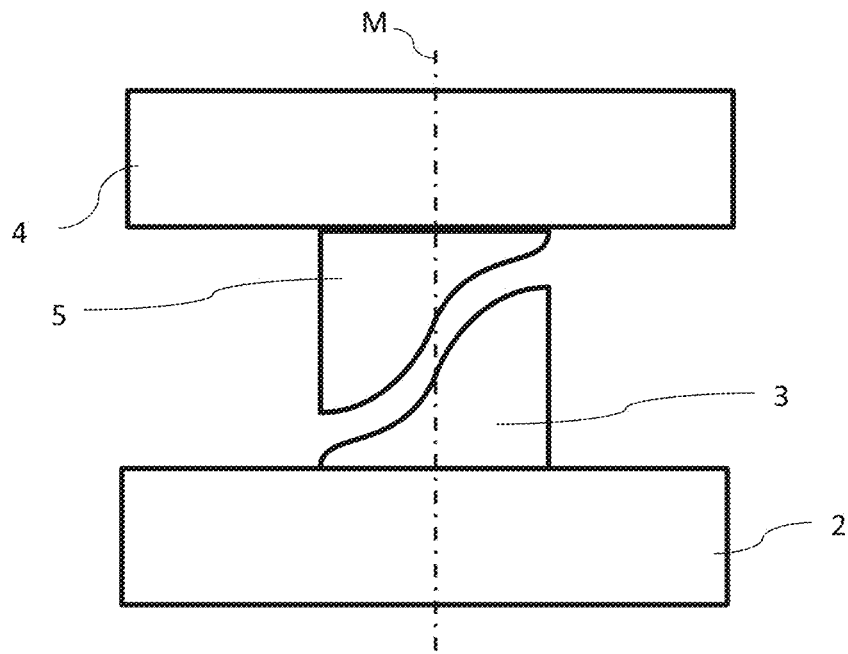

FIG. 6 shows another possible configuration of the flexible clamp members 3, 5 in which, contrary to the modification shown in FIG. 5, the inclined surfaces facing towards each other are not substantially straight but are formed curved. In the modification shown, the inclined surfaces can be described to comprise an S-shape having a greater inclination in the middle portion of the flexible clamp members 3, 5, i.e. near the middle plane M of the ski carrier clamp 1, compared to the inclination of the inclined surface at the lateral ends of the flexible clamp members, i.e. at a position at which the flexible clamp members 3, 5 comprise the greatest height dimension in a direction parallel to the middle plane M.

It is to be mentioned that in all embodiments and modifications, it is not necessary that the lateral outer walls of the flexible clamp members 3, 5 comprise a wall extending substantially parallel with respect to the middle plane M, i.e. substantially perpendicular with respect to the elongate base part or elongate top part, respectively. The lateral outer wall can also be inclined or comprise a curved shape. For example, although not shown, the outer wall of the flexible clamp members 3, 5 can be bulged in the laterally outward direction. The shape of the lateral outer wall can be suitably chosen in order to achieve a specific deformation of the flexible clamp members. For example, in case it is intended that the flexible clamp members collapse in a specific way in case they are compressed by the clamping action, the shape of the outer walls have an impact on the deformation behavior.

Figure 7:
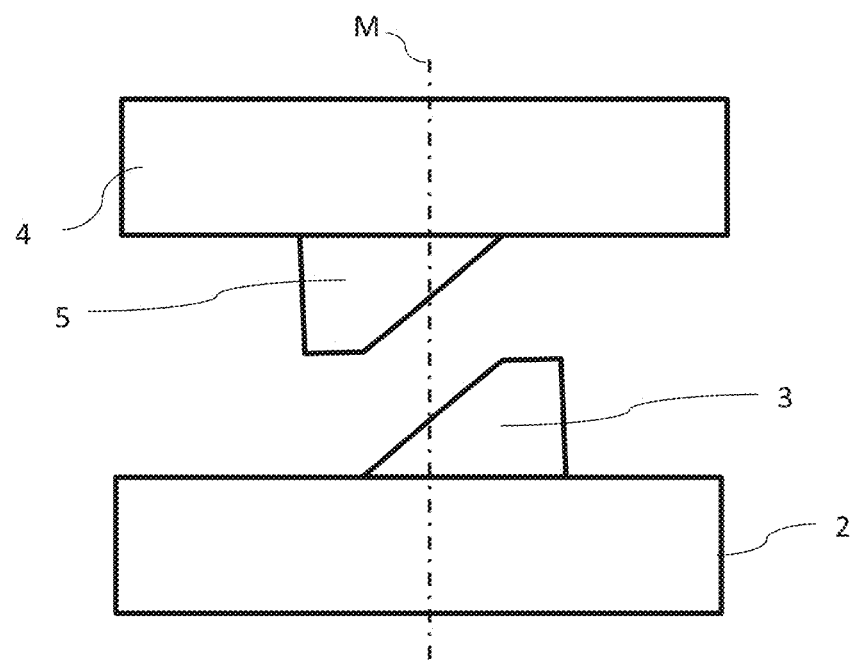

FIG. 7 shows a further alternative configuration of the flexible clamp members 3, 5. More precisely, as shown in FIG. 7, the flexible clamp members 3, 5 have a shape of a truncated triangle in which, compared to the triangular shape as shown in FIG. 5, the apex is cut off. By this, a supporting surface is provided on each of the flexible clamp members 3, 5 extending substantially parallel to the lateral extension direction of the elongate base part 2 and the elongate top part 4 and substantially perpendicular with respect to the middle plane M, respectively.

Figure 8:
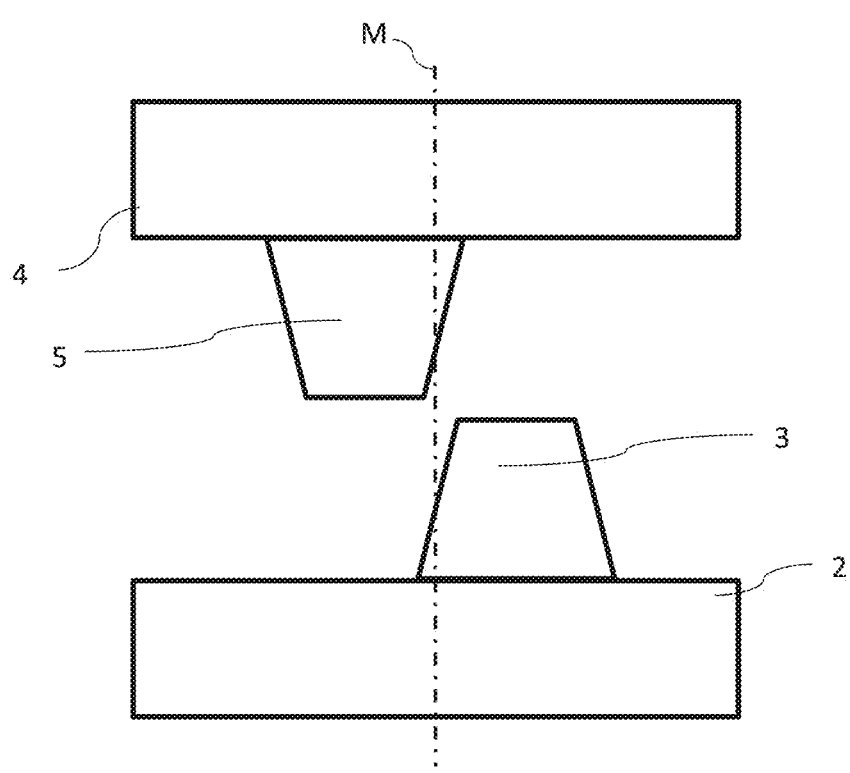

FIG. 8 shows another configuration of the flexible clamp members 3, 5 in which both flexible clamp members comprise a frustoconical shape.

Figure 9:
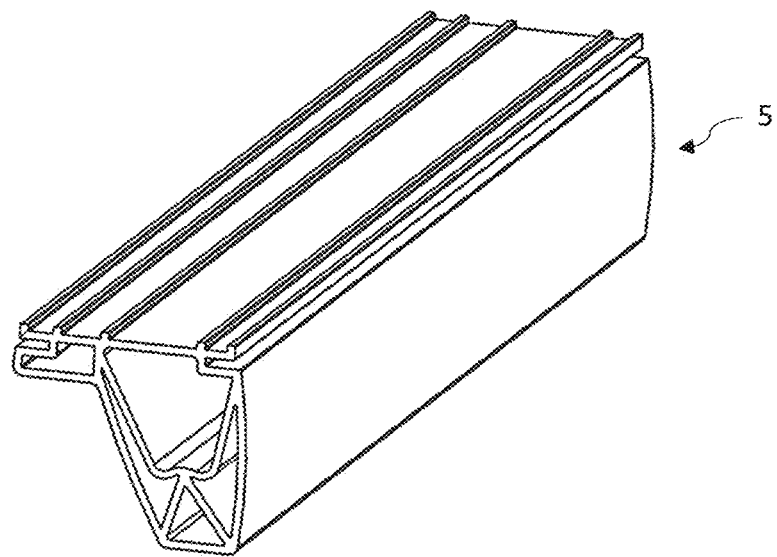
FIG. 9 shows an exemplary second flexible clamp member mountable to an elongate top part.
Figure 10:
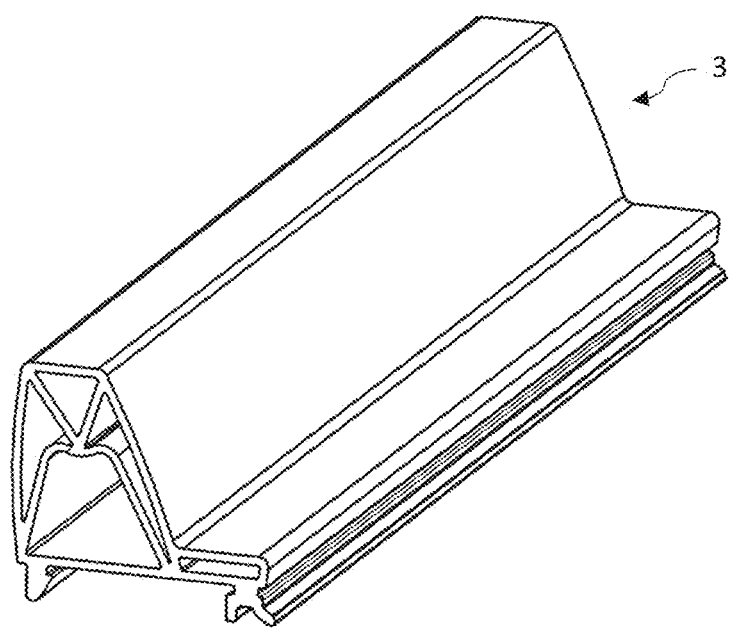
FIG. 10 shows an exemplary first flexible clamp member mountable to an elongate base part.

FIGS. 9 and 10 show another exemplary construction of the flexible clamp members 3, 5 in a perspective view. Both flexible clamp members are extruded rubber profiles comprising an outer contour allowing to achieve the above mentioned effects as substantial portions of the flexible clamp members are allowed to laterally pass each other. As regards an arrangement of the flexible clamp members on the elongate base part 2 and the elongate top part 4, it is referred to FIGS. 13 and 14 each showing a cross sectional view of the ski carrier clamp 1 comprising the elongate base part 2 and the elongate top part 4 carrying the first and second flexible clamp members 3, 5, respectively.

Figure 11:
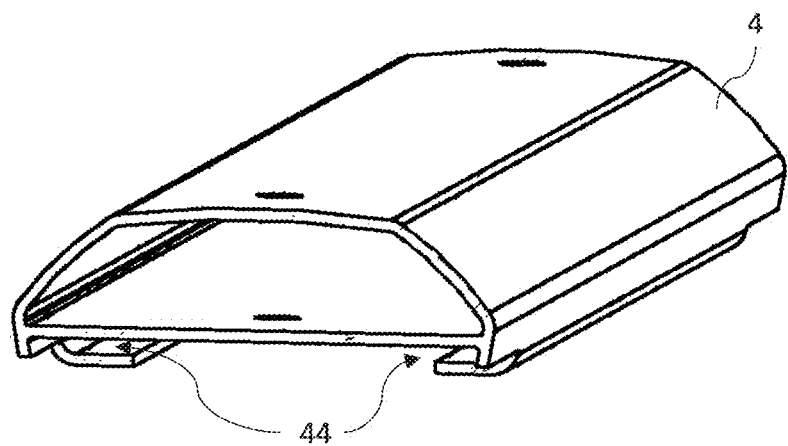
FIG. 11 shows an exemplary elongate top part.

FIG. 11 shows an exemplary elongate top part 4 onto which the second flexible clamp member can be mounted. The elongate top part 4 is an extruded aluminum profile and comprises two recesses 44 into which the second flexible clamp member 9 as shown in FIG. 9 can be inserted.

Figure 12:
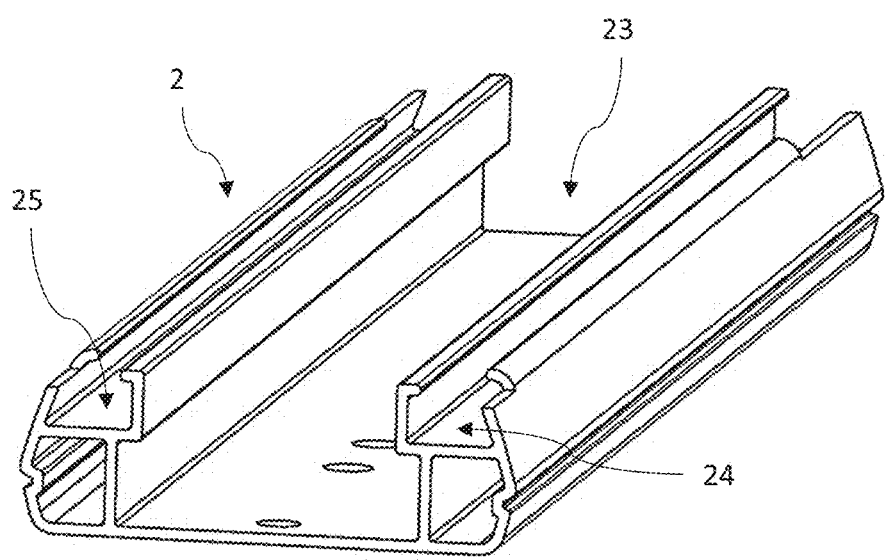
FIG. 12 shows an exemplary elongate base part.

FIG. 12 shows an exemplary elongate base part 2 onto which the first flexible clamp member 2 as shown in FIG. 10 can be mounted. The specific construction of the elongate base part 2 as shown in FIG. 12 is not crucial for the first embodiment but can be suitably used if desired. The specific construction of the elongate base part 2 as shown in FIG. 12 will be described later with respect to the second embodiment.

Figure 13:
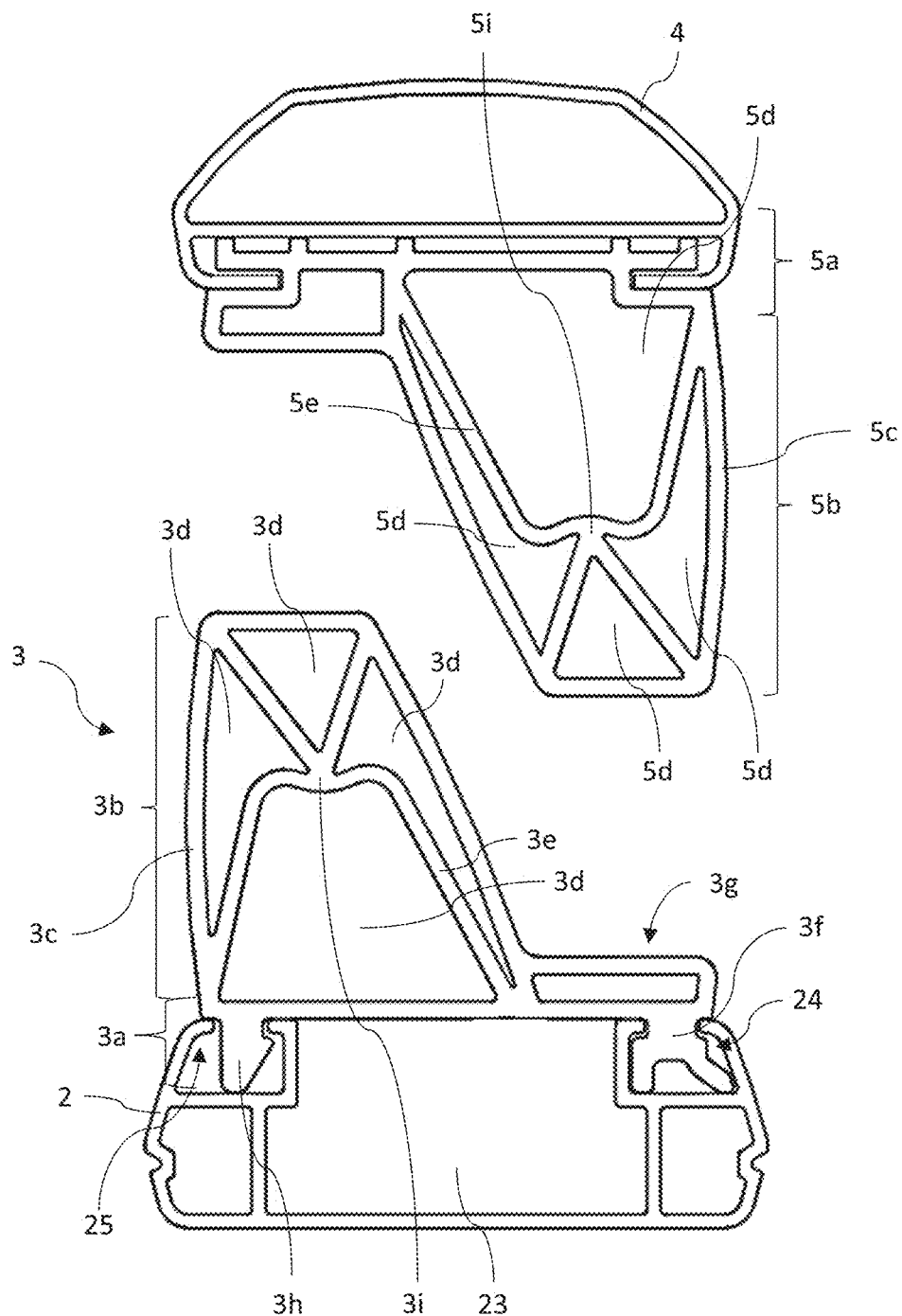
FIG. 13 and FIG. 14 show cross sectional views of a ski carrier clamp comprising flexible clamp members.
Figure 14:
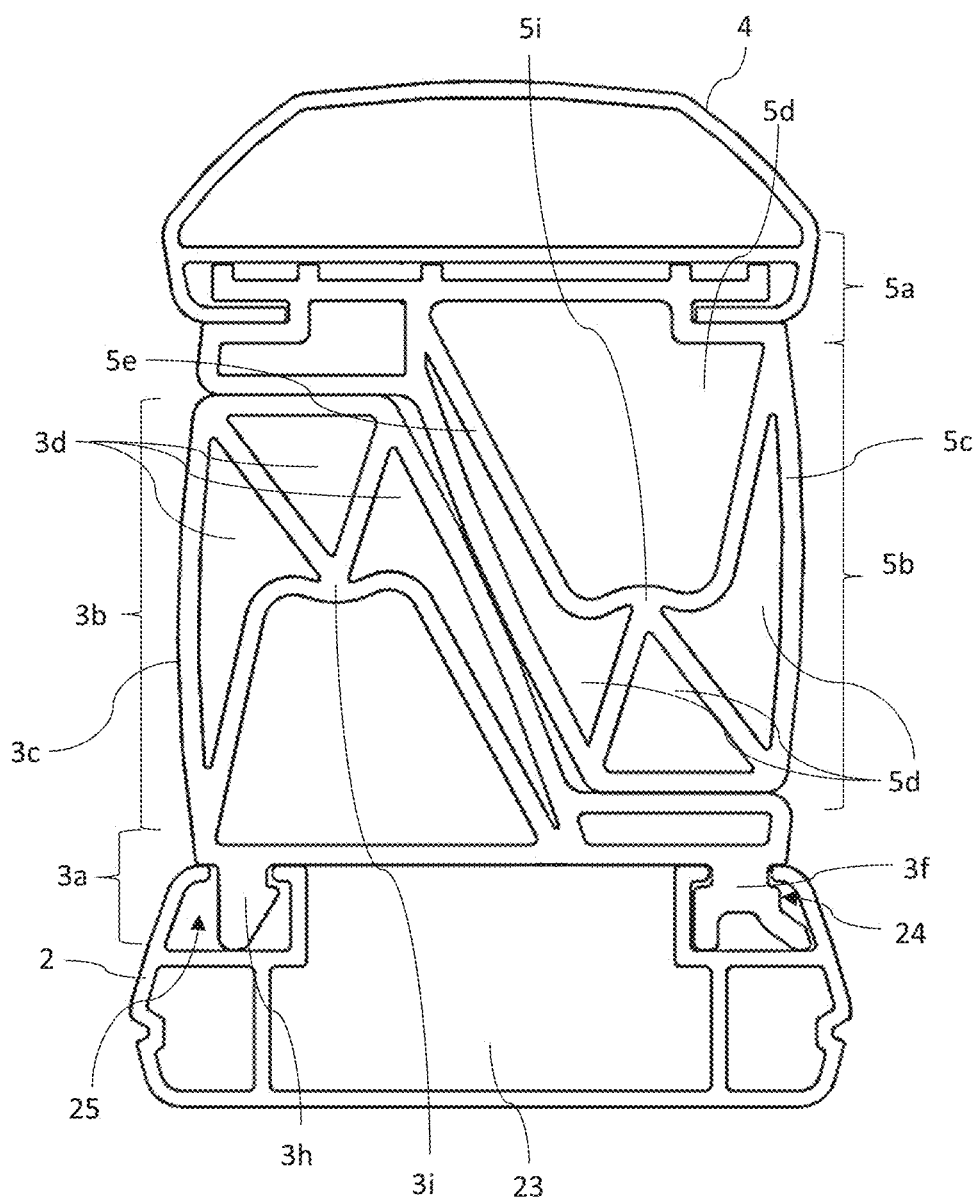

FIG. 13 and FIG. 14 show cross sectional views of the ski carrier clamp 1 comprising flexible clamp members 3, 5 as described above in a direction substantially perpendicular to the longitudinal direction of the ski carrier clamp. More precisely, the components shown in FIGS. 13 and 14 are an elongate base part 2 carrying a first flexible clamp member 3 and an elongate top part 4 carrying a second flexible clamp member 5. Generally, each flexible member has a base portion 3a, 5a which is adapted for a contact with the respective elongate part, i.e. the elongate base part 2 or the elongate top part 4. Preferably, the base portions 3a, 5a of the respective flexible clamp members 3, 5 can be specifically structured so as to allow a proper fixation on the elongate base part 2 and the elongate top part 4. For that purpose, the base portions can comprise protrusions which are engageable with recesses provided in the elongate base part or the elongate top part or clamp members can comprise recesses into which protrusions provided on the elongate base part or the elongate top part can engage. It is also possible, to fixedly bond the flexible clamp members to the elongate base part and the elongate top part, if desired.

The flexible clamp members further comprise first and second projecting portions 3b, 5b protruding from the first and second base portions 3a, 5a in a direction away from the elongate base part 2 and the elongate top part 4, respectively. Furthermore, in order to achieve the above mentioned effect, an outer contour of a cross section of the elongate base part 2 in combination with the first flexible clamp member 3 carried thereon is asymmetric. The same applies for the outer contour of a cross section of the elongate top part 4 in combination with the second flexible clamp member 3 carried on the same. That is, an overall outer contour of a cross section in a direction perpendicular to the longitudinal directions of the elongate base part 2 and the elongate top part 4, respectively, of the elongate parts in combination with the flexible clamp members carried thereon has an asymmetric shape. In the present embodiment, the elongate top part is symmetrically designed and the asymmetric shape arises from the asymmetry of the second flexible clamp member 5. The same applies for the elongate base part 2 and the first flexible clamp member 3.

As is shown in FIGS. 13 and 14, the asymmetrically shaped elements are arranged in an inverted manner allowing both flexible clamp members 3, 5 to nest with each other as shown in FIG. 14 as the projection portions 3b, 5b are offset with respect to each other in the lateral direction.

The flexible clamp members 3, 5 comprise a construction having interior hollow spaces 3d, 5d separated by interior walls 3e, 5e. The hollow spaces and interior walls can be arranged in different ways and can be arranged so as to promote or positively influence the deformation characteristics of the flexible clamp members 3, 5. In the present embodiment, the projecting portions 3b, 5b comprise four hollow spaces 3d, 5d which are separated by four walls 3e, 5e meeting in a common point 3i, 5i. The lower walls of the first flexible clamp member 3, i.e. the walls extending from the lower portion of the flexible clamp member 3, have a smaller wall thickness at least at their upper portion at which they are connected to the common point 3i promoting the collapsing of the flexible clamp member upon compressing the same in the vertical direction in FIGS. 13 and 14. The construction of the projection portion 5b is the same in an inverted manner.

In the present embodiment, the flexible clamp members 3, 5 are constructed and arranged such that the projecting portions 3b, 5b contact the respective other flexible clamp member 2, 4 and do not get in contact with an elongate part other than the one on which they are carried.

Furthermore, the laterally outer wall 3c, 5c of each of the first and second flexible clamp members 3, 5 extends in a substantially vertical manner in FIG. 13 and comprises a slightly curved shape such that each is slightly bulged laterally outward.

As is obvious from the above description, the interior walls and hollow spaces have an influence on the deformation behavior of the flexible clamp members 3, 5 and consequently form a deformation pattern. While one of such a deformation pattern is shown in the figures, it is to be mentioned that the patterns can be suitably amended in order to achieve a desired deformation.

As regards the outer walls 3c, 5c of the flexible clamp members, at least the one of them facing the headwind when mounted on a vehicle can be enforced by an increased wall thickness, for instance. By this, it is prevented that the wall facing the headwind is deformed by the same thereby reducing noise generation and wind resistance.

Second Embodiment

A second embodiment of the present subject matter is described with respect to FIGS. 12, 13, 14 and 16. The ski carrier clamp can have the same general construction as that described with respect to FIG. 1 and can also comprise the beneficial constructions as described with respect to the first embodiment. However, in the second embodiment, it is focused on the connection between the first flexible clamp member 3 and the elongate base part 2.

Figure 16:
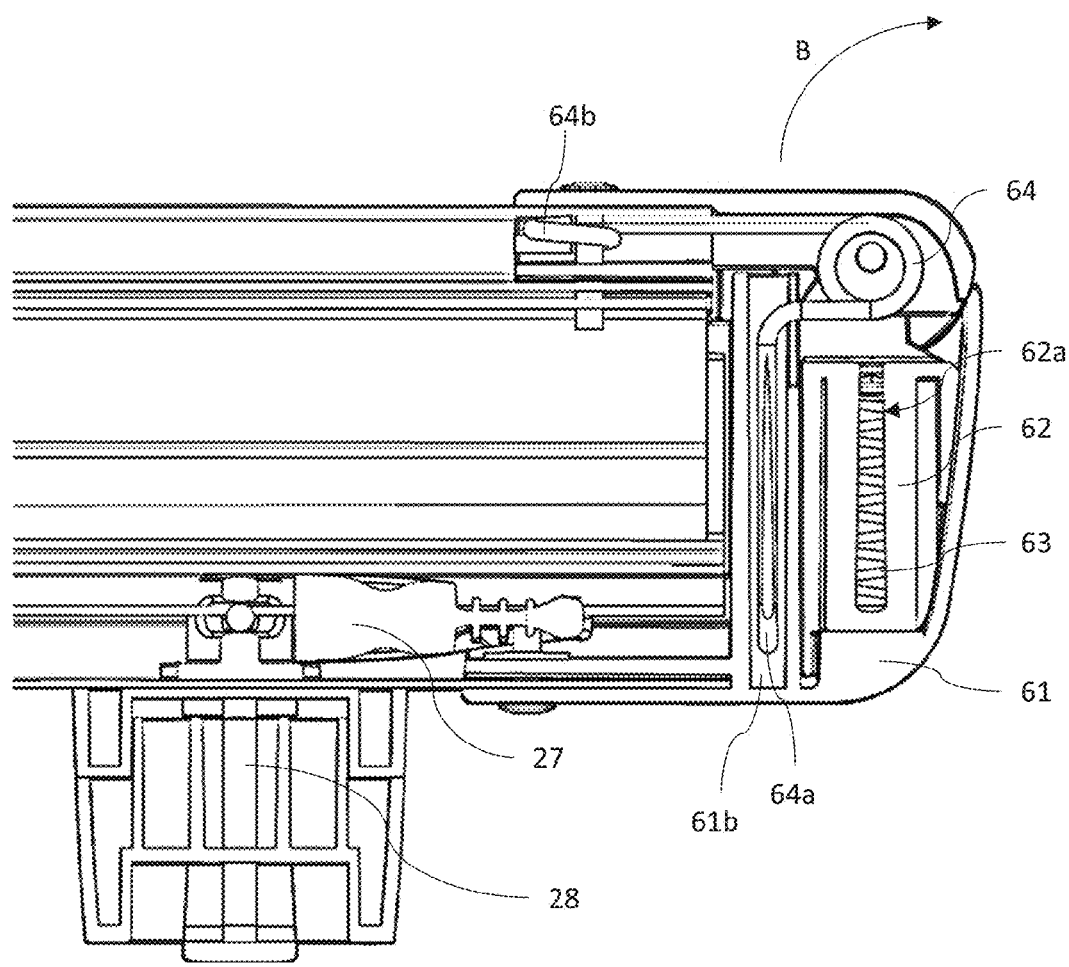
FIGS. 16 and 17 are cross sectional views of an end portion of a ski carrier clamp at which a hinge mechanism is provided.

In order to mount the ski carrier clamp 1 on cross bars of a vehicle roof carrier, it is necessary to design the elongate base part such that it allows a proper fixation on the cross bars. In other words, the elongate base part needs to be designed such that a fixation means can be engaged with or provided on the same. For that purpose, the elongate base part is according to the second embodiment formed so as to comprise an installation space for accommodating a fixation means, for example a tensioning lever 27 connected to a threaded bolt 28. In the second embodiment as shown in FIG. 12, the elongate base part 2 comprises a mounting recess 23 which comprises a dimension to allow a full accommodation of the tensioning lever 27 in a retracted condition, that is in a condition in which it extends along the elongate base part 2 and tensions the threaded bolt 28. An exemplary tensioning lever 27 being in the retracted condition is depicted in FIG. 16 which shows a view of an end portion of a ski carrier clamp in cross section taken in the longitudinal direction of the ski carrier clamp. With such a construction, it is possible to provide a flexible clamp member also in the area where the fixation means is provided. In other words, it is possible to use a flexible clamp member on the elongate base part which extends along and covers the mounting recess thereby allowing to provide a maximum supporting area by means of the flexible clamp member.

In order to access the mounting recess 23 and a fixation means provided therein, the elongate base part 2 according to the second embodiment comprises a mounting structure comprising an attaching recess 24 which in this embodiment extends substantially parallel with the mounting recess 23. The attaching recess 24 is configured to accommodate a mounting portion 3f of the first flexible clamp member 3 therein. As is shown in FIGS. 13 and 14, the mounting portion 3f is designed such that a detachment of the flexible clamp member 3 in a vertical direction in FIG. 13 is not possible. However, the mounting portion 3f is formed elastically thereby providing a hinge mechanism and allowing a rotational movement of the projecting portion 3b about the mounting portion 3f. For that, the mounting portion 3f basically has a shape comprising a neck portion which has a width that is slightly smaller than the width of the attaching recess 24 and a body portion having a dimension which is wider than the width of the attaching recess 24 and consequently is too wide for passing the mounting portion 3f through the attaching recess 24. Accordingly, in order to mount the first flexible clamp member 3 on the elongate base part 2, the mounting portion 3f has to be slidably inserted into the attaching recess 24 in the longitudinal direction of the elongate base part 2. As is shown in FIG. 13, the mounting portion 3f is provided on one lateral side of the first flexible clamp member 3, that is on the right side in FIG. 13. Due to this construction, it is possible to swivel the first flexible clamp member 3 about the mounting portion 3f which acts as a hinge allowing to move the first flexible clamp member between a non-access position as shown in FIGS. 13 and 14 and an access position (not shown) in which it is possible to access the mounting recess 23. Accordingly, a construction is provided allowing easy access to the mounting recess 23 while at the same time providing a support over substantially the entire length of the elongate base part 2. In other words, it is not necessary to provide access spaces on both longitudinal sides of the flexible clamp members.

In order to provide an additional fixation of the first flexible clamp member 3 on the elongate base part 2, the elongate base part can comprise an engaging means 25 with which an engaging portion 3h of the flexible clamp member 3, preferably located on the laterally opposite side of the flexible clamp member 3 compared to the mounting portion 3f, is engageable. Such an engaging portion 3h is embodied as a projection having a hook like shape in the present embodiment. The hook is deformable and thus allows a releasable engagement with an engaging means 25 provided in the elongate base part 2. The engaging means 25 is embodied as a groove formed in the longitudinal direction of the elongate base part 2. FIGS. 13 and 14 show conditions in which the engaging portion 3h is engaged with the engaging means 25 thereby releasably locking the left side of the first flexible clamp member 3 to the elongate base part 2.

Third Embodiment

A third embodiment of the present subject-matter is described with reference to FIGS. 2, 3, 15, 16 and 17.

Figure 2:
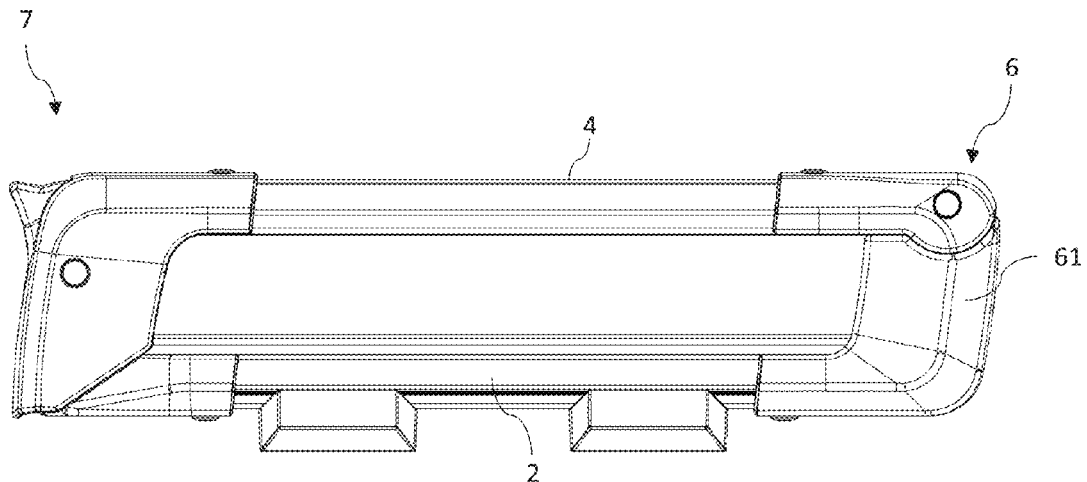
FIG. 2 shows a side view of a ski carrier clamp.
Figure 3:
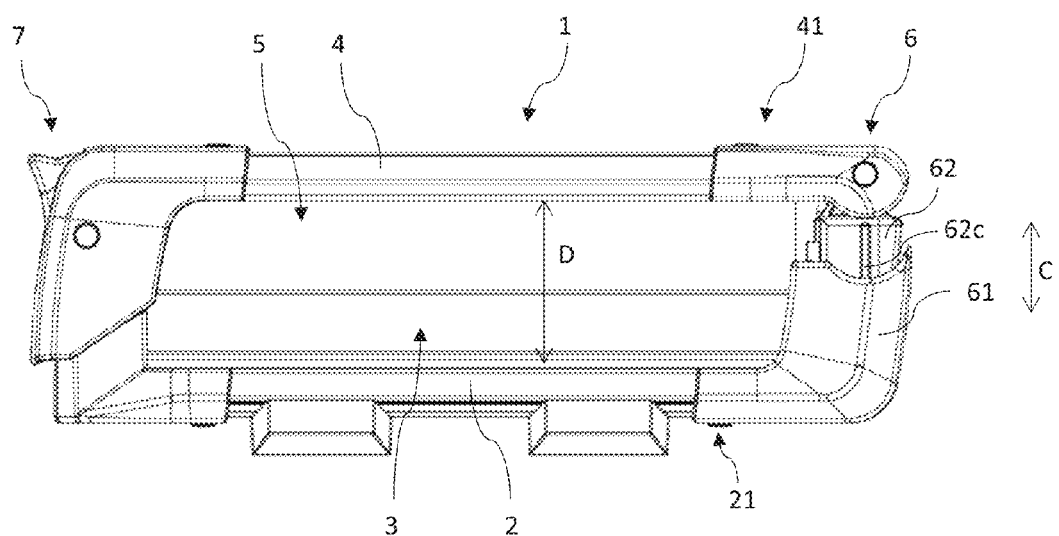
FIG. 3 shows another side view of a ski carrier clamp.

FIG. 2 shows a side view of a ski carrier clamp 1 having the basic construction as described above with respect to FIG. 1. FIG. 3 also shows a side view of the ski carrier clamp 1 as viewed in the same direction as in FIG. 2. The difference between FIGS. 2 and 3 is that the ski carrier clamp is shown in different states as follows.

FIG. 2 shows a state in which the ski carrier clamp is in a compact condition and FIG. 3 shows the ski carrier clamp 1 in an expanded condition. The condition of the ski carrier clamp 1 shown in FIG. 2 can also be referred to as a non-use condition in which the elongate top part is brought into a condition where it is located more closely to the elongate base part 2 compared to the condition shown in FIG. 3.

The condition of the ski carrier clamp as shown in FIG. 3 can also be referred to as use condition in which the elongate top part 4 is at a position more remote from the elongate base part 2 compared to the non-use condition shown in FIG. 2. That is, a distance D between the elongate top part 4 and the elongate base part 2 is greater when the ski carrier clamp 1 is in the expanded condition, i.e. the use-condition. In this connection, it is to be noted that use-condition is to be understood as a condition in which winter sport equipment is arranged in the ski carrier clamp.

In order to allow the elongate top part 4 to take the different positions as shown in FIGS. 2 and 3, the hinge mechanism 6 is constructed so as to be expandable. More precisely, the hinge mechanism 6 comprises a guiding portion 61 and a guided element 62 slidably accommodated in the guiding portion 61. In the construction as shown, the guiding portion 61 is coupled to the elongate base part 2 at a first end 21 of the same. A first end 41 of the elongate top part 4 is hingedly coupled to the guided element 62 at an upper portion of the same. The guided element 62 is slidably inserted and held in the guiding portion 61.

In order to precisely define and also limit the movement of the guided element 62, the guided element 62 comprises an outer shape, a substantially polygonal shape in the present embodiment, in order to prevent a rotation of the guided element 62 with respect to the guiding portion 61. The guided element 62 also comprises a guiding groove 62c into which a protrusion (not shown) provided in the guiding portion 61 engages. In order to limit the movement of the guided element 62 with respect to the guiding portion 61, the guiding groove can only be partially formed on the outer surface of the guided element 62 and end at a specific height near the lower end of the guided element 62. The protrusion can be formed at a specific height of the guiding portion 61. Thus, in case the guided element 62 has reached a specific height by movement in the upward direction, the protrusion will abut against an end wall of the groove 62c functioning as a stop.

Furthermore, according to the present construction, the guided element 62 and the guiding portion 61 are formed such that the guided element 62 can slidably move in a direction substantially perpendicular to the extension direction of the elongate base part 2 as is indicated by arrow C in FIG. 3. In other words, when viewing the ski carrier clamp as shown in FIGS. 2 and 3, the guided element 62 is allowed to slidably move in a substantially vertical direction. In this connection, however, it is to be noted that it is not necessary that the guided element 62 is guided substantially perpendicular with respect to the elongate base part 2. It is also possible that the guided element 62 is slidably moved in a direction which is inclined with respect to the longitudinal direction of the elongate base part 2. Other movements of the guided elements 62 are possible as well as long as it is possible to increase the distance between the elongate top part 4 and the elongate base part 2. Accordingly, it is also possible to guide the guided element 62 such that it is not moved on a linear path but along a path which is at least partially curved.

As regards the construction of the hinge mechanism 6 as described above, it is also possible to use a hinge mechanism with an inverted arrangement, that is an arrangement in which the guided portion is provided above the guided element. In this case, the elongate base part would be hingedly coupled to a lower portion of the guided element. The other features would be correspondingly invertedly implemented.

As already described before, the ski carrier clamp as shown in FIGS. 2 and 3 can take two different conditions. The condition as shown in FIG. 2 can be described as compact condition in which the elongate top part 4 is positioned closer to the elongate base part 2 as compared to the condition shown in FIG. 3 which can be described as expanded condition in which the elongate top part 4 is arranged at a greater distance from the elongate base part 2. In order to enable the ski carrier clamp 1 to take both of the latter described conditions, the ski carrier clamp according to this aspect of the present subject matter comprises the hinge mechanism 6 which is designed so as to allow the function as described before. For that, the hinge mechanism 6 is constructed so as to allow a change in the distance between the two supporting positions at which the elongate top part 4 and the elongate base part 2 are connected to the hinge mechanism 6, respectively. In the expanded condition, as is shown in FIG. 3, it can be seen that the hinge mechanism 6 comprises an element on which the elongate top part 4 is hingedly connected which is also be referred to as guided element 62. The guided element 62 is accommodated in the guiding portion 61 of the hinge mechanism 6. The elongate base part 2 is connected to the guiding portion 61 of the hinge mechanism 6. Consequently, by moving the guided element 62 with the guiding portion 61, the supporting points at which the elongate top part 4 is coupled to the guided element 62 is moveable with respect to the guiding portion 61 and consequently with respect to the elongate base part 2.

In the present embodiment, as shown in FIG. 3, the guided element 62 comprises the guiding groove 62c which extends in a direction substantially perpendicular to the extension direction of the elongate base part 2. In other words, the guiding groove 62c extends in a vertical direction when viewed in a way as depicted in FIG. 3. Accordingly, in the present embodiment, when the ski carrier clamp is mounted to a cross bar of a vehicle roof carrier, a hinge axis of the elongate top part 4 is vertically moveable with respect to the cross bars. Accordingly, the hinge mechanism 6 as described allows for a height change of the ski carrier clamp as is directly obvious from a comparison of FIGS. 2 and 3.

As is also directly obvious from the latter figures, the height change results in a change of an area on which the headwind impinges during driving of the vehicle. In case no winter sport gear is transported in the ski carrier clamp, the ski carrier clamp can be brought in the compact condition as shown in FIG. 2 thereby reducing the area on which the headwind impinges, thereby reducing the wind resistance of the ski carrier. Accordingly, during non-use of the ski carrier, the fuel consumption can be reduced in this way and, furthermore, there is the beneficial effect of a noise reduction due to less wind resistance.

It is to be noted, that different configurations of the hinge mechanism 6 are possible as long as the ski carrier clamp can assume a compact and an expanded condition as described before. For example, the movement of the guided element 62 does not have to be vertically or strictly linear as described above. It is also possible to provide a guiding of the guided element 62 in the guiding portion 61 allowing a movement of the guided element 62 on other suitable paths including, for example, a curved path or a path inclined with respect to the elongate base part 2.

Figure 15:
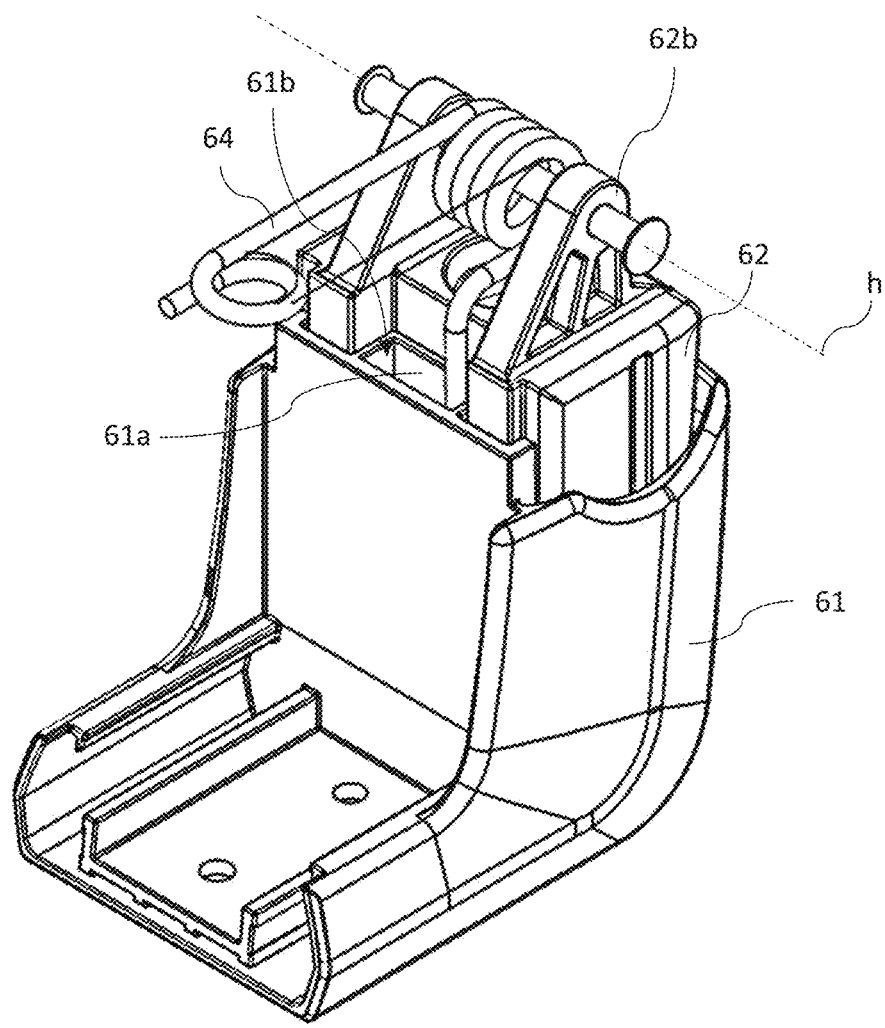
FIG. 15 shows a perspective view of main components of a hinge mechanism.

The hinge mechanism 6 according to the present embodiment is described in greater detail with respect to FIGS. 15, 16 and 17 in the following. FIG. 15 shows a perspective view of main components of the hinge mechanism 6. These main components include the guiding portion 61, which in the present case is provided on the lower side of the hinge mechanism 6, the guided element 62 and a torsion spring 64.

The guided element 62 comprises an outer contour which is noncircular and in the present case inter alia comprises the above described guiding groove 62c. The guided element 62 is accommodated in the guiding portion 61 slidably and non-rotatably. For that purpose, the inner contour of the guiding portion 61 is shaped corresponding to the outer contour of the guided element 62. Accordingly, a construction is achieved in which the guided element 62 is slidably moveable in the guiding portion 61 in a direction substantially vertically in FIG. 15.

On the upper end of the guided element 62, a supporting portion 62b is provided which essentially consists of two protrusions each having a supporting opening for supporting a pin 65. The pin 65 serves for hingedly connecting the elongate top part 4 to the guided element 62.

The hinge mechanism according to the present embodiment further comprises a torsion spring 64 which is wound around the pin 65 at a coil portion 64c thereof and comprises two ends 64a, 64b via which a spring force is transmitted to the elongate top part 4 and the guiding portion 61. In the present embodiment, the torsion spring 64 is pretensioned such that its end 64b connected to the elongate top part 4 exerts a force on the elongate top part 4 in a direction of arrow B in FIG. 16. By this, the torsion spring 64 exerts a force on the elongate top part 4 urging the same in an opening direction about the hinge axis h. By this configuration, it is possible that the elongate top part 4 is held in the open position, thereby allowing to easily load the ski carrier clamp 1. In order to be able to exert such an urging force on the elongate top part 4, the other end 64a of the torsion spring 64 needs to be supported properly. In order to prevent a force transmission on the guided element 62 as far as possible, the first end 64a of the portion spring 64 is therefore not supported on the guided element 62 but on a supporting surface 61a provided in the guiding portion 61. With this configuration, it is possible to reduce a negative influence from forces acting on the guided element 62, leading to a reduction of skewing of the guided element 62 with respect to the guiding portion 61. Thus, by this configuration, the slidability of the guided element 62 in the guiding portion 61 is enhanced.

Figure 17:
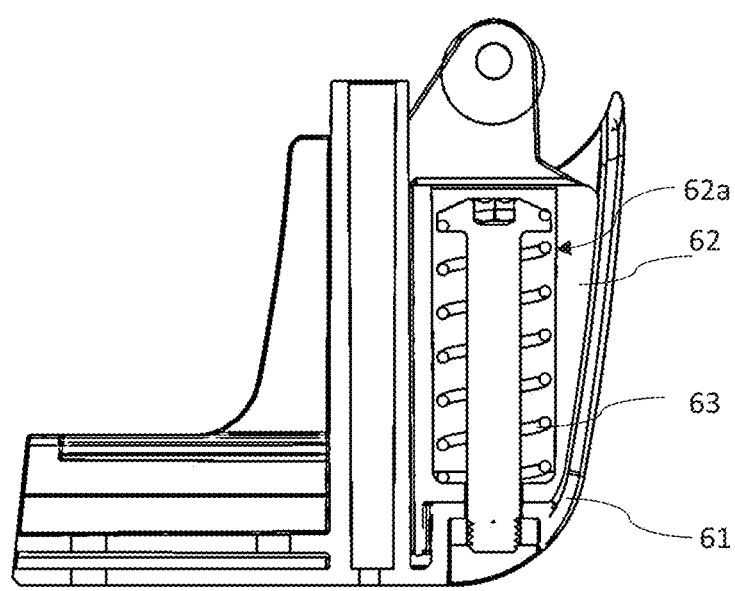

Further details of the hinge mechanism 6, according to the present example, are shown in FIGS. 16 and 17. FIGS. 16 and 17 are cross sectional views of an end portion of the ski carrier clamp 1 at which the hinge mechanism 6 is provided, wherein the cross sections are taken in a longitudinal direction of the ski carrier clamp. FIGS. 16 and 17 furthermore differ in the number of parts shown and in that the sectional planes are offset with respect to each other. While in FIG. 17 the sectional plane is arranged substantially in the middle of the guided element 62, the sectional plane in FIG. 16 is offset so that the location of the first end 64a of the torsion spring 64 is visible.

In FIG. 16, the arrangement of the torsion spring 64 as well as the arrangement of the guided element 62 in the guiding portion 61 is shown in greater detail. The guiding portion 61 comprises a guiding recess 61b which is limited on one side by the guiding surface 61a. The first end 64a of the torsion spring 64, that is the lower end in the present embodiment, is accommodated in the guiding recess 61b. More precisely, the first end 64a is provided in the recess 61b with a predetermined play between the same and the side walls limiting the recess 61b such that the first end 64a is free to move to a certain extent. With this arrangement, the first end 64a of the torsion spring 64 is slidably held in the guiding recess 61b. As already mentioned, the torsion spring 64 comprises a coil portion 64c at which the torsion spring 64 is wound around the pin 65. Although a space is provided between the pin 65 and the coil portion 64c, an arrangement is possible in which the coil portion 64c directly contacts the pin 65. By this, the pin 65 will be able to exert a force on the coil portion 64c thereby allowing to drag the torsion spring 64 upon movement of the guided element 62.

The guided element 62 is moveable in a direction as indicated with arrow C in FIG. 3. Since the movement of the torsion spring 64 is coupled to the movement of the guided element 62, according to the arrangement shown in FIG. 16, the first end 64a of the torsion spring 64 will correspondingly move in case the guided element 62 is moved. Since the first end 64a is always arranged in the recess 61b, a rotational movement of the first end 64a about a central axis of the coil portion 64c is prevented while a movement in the direction of the arrow C is possible. As is also shown in FIG. 16, the sliding surface 61a is provided on a partition wall 61c partitioning a space of the recess 61b from an accommodating space of the guiding portion 61 for accommodating the guided element 62. Accordingly, a force transmitted by the first end 64a of the portion spring 64 is transmitted to a portion of the guiding portion 61. Consequently, forces exerted and transmitted by means of the torsion spring 64 are directly transferred to the elongate top part 4 and the guiding portion 61, respectively and substantially no force is transferred from the portion spring 64 to the guided element 62. As regards the connection of the torsion spring 64 to the elongate top part 4, the second end 64b of the torsion spring 64 is in the present embodiment wound around a connecting pin 67 fixedly mounted to the elongate top part 4. By this, the location of the coil spring is additionally defined.

As is also shown in FIG. 16, the hinge mechanism 6 additionally comprises a spring 63 provided in a recess 62a of the guided element 62. In the present embodiment, the spring 63 is a compression spring and is arranged so as to provide a force urging the guided element 62 in the downward direction. In other words, the spring 63 is provided such that the hinge mechanism 6 tends to assume its retracted condition in case no further forces are exerted thereon. As already mentioned above, the retracted condition corresponds to a condition in which the height of the ski carrier clamp is minimized with the beneficial effect that the wind resistance of the ski carrier clamp is minimized as well.

The arrangement of the spring 63 is shown in FIG. 17 in greater detail. FIG. 17 is a cross sectional view of the guided element 62 as well as the guiding portion 61 taken substantially in the middle of the guided element 62. As is shown in FIG. 17 as screw is inserted into the recess 62a, passed through an opening of the guided element 62 and fixed to the guiding portion 61 at its lower end. The spring 63 is arranged so as to surround the screw shaft and is provided between the lower portion of the screw head and the bottom portion of the recess 62a. Consequently, in case the guided element 62 is moved in the upward direction, the spring 63 is compressed and exerts a force in the downward direction.

Fourth Embodiment

A fourth embodiment of the present subject matter is described in the following with respect to FIG. 18. The ski carrier clamp can have the same general construction as that described with respect to FIG. 1 and can also comprise the beneficial constructions as described with respect to the other embodiments. However, in the fourth embodiment, it is focused on the locking mechanism 7 for locking the elongate base part 2 and the elongate top part 4.

According to the fourth embodiment, the ski carrier clamp 1 comprises an elongate base part 2 and an elongate top part 4 hingedly coupled to each other at their first end portions 21, 41 by a hinge mechanism 6. The hinge mechanism 6 can be constructed as described above with respect to the third embodiment. At their second end portions 22, 42, the elongate base part 2 and the elongate top part 4 are lockable to each other by means of the locking mechanism 7 which is shown in greater detail in FIG. 18.

The locking mechanism 7 according to the embodiment comprises a flexible locking wire which is embodied as a locking spring 71. That is, the flexible locking wire 71 according to the present embodiment has two functions, namely a locking function and a spring function.

Figure 18:
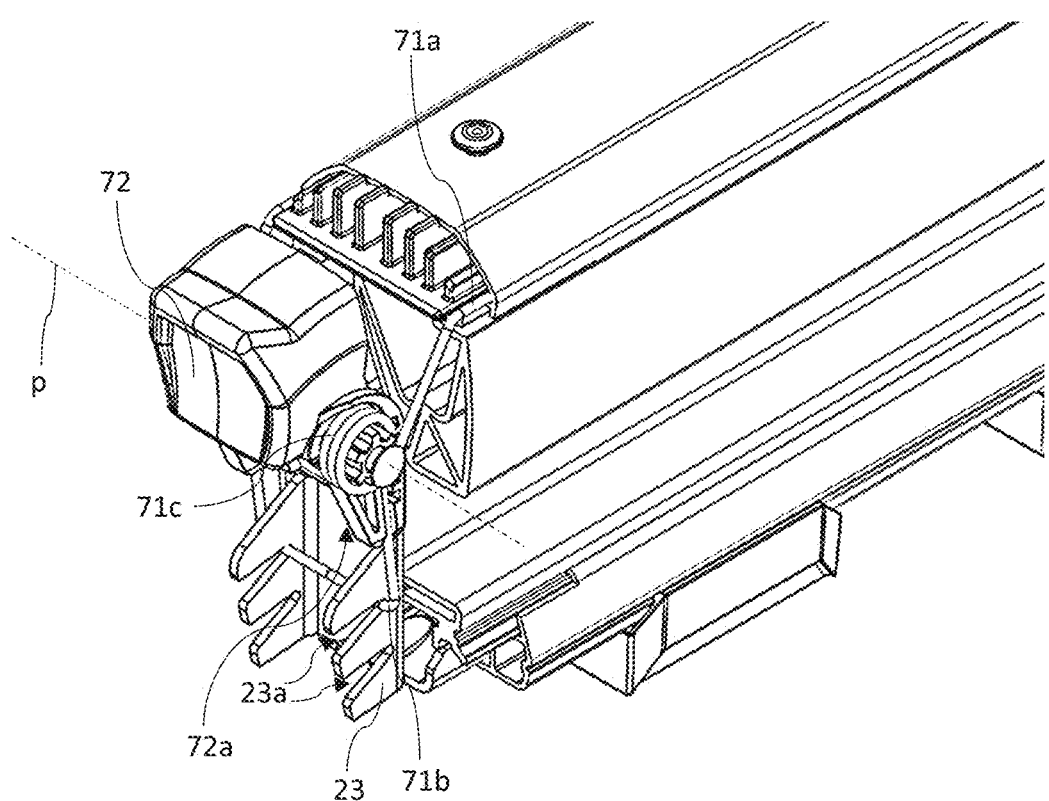
FIG. 18 is a perspective view of main components of a locking mechanism.

As is shown in FIG. 18, the locking spring 71 comprises a coupling portion 71a and an engaging portion 71b. The coupling portion 71a is coupled to elongate top part 4 by clamping the same between an insert 43 inserted into the longitudinal end of the elongate top part and an inner wall of the elongate top part 4. In order to provide a firm fixation of the coupling portion 71a the ends of the same can be bent so as to partially extend in a direction substantially perpendicular to the longitudinal direction of the elongate top part 4. In other words, the ends of the coupling portion 71a can be formed so as to partially surround inner edges of the insert 43 so that a movement of the coupling portion 71a in the longitudinal direction of the elongate top part 4 is prevented. Other ways of fixation of the coupling portion 71a to the elongate top part 4 are also possible as long as a proper fixation can be realized and a force transfer from the elongate top part 4 directly to the flexible locking wire 71 is possible.

As is also shown in FIG. 18, the locking spring 71 comprises an engaging portion 71b at its other end, i.e. the lower end in FIG. 18. The engaging portion 71b is bent and comprises a section extending cross to the longitudinal direction of the elongate top part 4 and the elongate base part 2. The engaging portion 71b is provided for engaging with a locking portion 26 fixedly connected to the elongate base part 2. The locking portion 26 according to the present embodiment is made of metal and is suitably coupled to the elongate base part 2, e.g. by welding, riveting or screwing. The locking portion 26 comprises teeth defining engaging recesses 26a between them. As is shown in FIG. 18, the engaging portion 71b is engaged with the upper one of both recesses thereby providing a connection which prevents a movement of the elongate top part 4 away from the elongate base part 2.

The locking spring 71 furthermore comprises a coil portion 71c at which the locking spring 71 is wound about an axis P. The coil portion 71c serves as a pretensioning section urging the engaging portion 71b in a locking direction, i.e. in a direction towards the locking portion 26. Accordingly, the engaging portion 71b will engage with the recess formed between the teeth of the locking portion 26 in case the elongate top part 4 is moved into the position shown in FIG. 18. It is to be noted that an urging force for urging the engaging portion 71b in a locking direction does not necessarily have to be generated by a coil portion but can be generated by other suitable shapes or designs of the locking spring, i.e. by the flexibility of the wire itself. The coil portion 71c is optional and can be omitted in a modification. According to a further modification, it is possible that the urging force is generated by a further separate means acting on the flexible locking wire instead of using a locking spring.

The locking mechanism 7 further comprises a push button 72 embodying a release member for moving the engaging portion 71b in a disengaging direction. The push button 72 is mounted rotatable about the axis P in that it is mounted on a pivot pin 73 extending in the direction of the axis P. The pivot pin 73 can be supported on a housing 74 of the hinge mechanism 6 which is connected to the elongate top part 4 as is shown in FIG. 1.

The push button 72 comprises two supporting sections 72a, one on each side of the push button 72, which partially support the locking wire 71. The supporting sections 72a extend in a direction radially from said axis P in a downward direction in FIG. 18. More precisely, the supporting section 72a protrude from a root section onto which the locking spring 71 is wound at its coil portion 71c and comprises a recess in which a section of the locking spring 71 between the coil portion 71c and the engaging portion 71b is supported. With this configuration, it is possible to suitably exert a force on the engaging portion 71b for urging the same in an unlocking direction.

With the above construction of the locking wire 71, it is possible to more reliably transfer forces from the elongate top part 4 to the elongate base part 2 leading to a more secure locking of the ski carrier clamp 1. This is beneficial from a crash safety aspect as such a connection will withstand higher crash forces thereby preventing the ski carrier clamp from opening to a greater extent.

Instead of using the above mentioned locking wire, it is possible to use a locking sheet metal comprising a coupling section, an engagement section, a supporting section and an elastically deformable flexing section. In other words, it is possible to substitute the wire by a suitable locking sheet metal having a necessary elasticity. The coupling section and the engagement section of the locking sheet metal have generally the same function as the coupling section 71a and the engagement section 71b of the locking wire 71. A supporting pin suitable for rotatably supporting the locking sheet metal can be coupled to the supporting section of the locking sheet metal. Accordingly, a construction is achieved in which the engagement section of the locking sheet metal is movable about the supporting pin. In this configuration of the locking sheet metal, the flexing section is provided between the supporting section and the coupling section of the elastic locking sheet metal leading to an arrangement in which a deformation of the flexing section leads to a movement of the engagement section about the supporting pin. A push button can be provided for exerting a force on the flexing section for urging the engagement section in the opening direction. On the other hand, the flexing section provides a sufficient restoring force. Thus, in case the force is released from the flexing section, the engagement section will return into the locking position in which it can securely engage with the locking portion. It is to be noted that the locking sheet metal and the supporting pin can be integrally formed or can be separate parts suitably coupled to each other. Furthermore, the locking sheet metal can be integrated into another material, plastics for example, or a further material can be applied on the locking sheet metal to cover the same.

It is to be noted that the present subject matter has been described by way of the above four embodiments. Each of the embodiments describes a preferable construction of a ski carrier clamp or a part for a ski carrier clamp. It is, however, to be noted that the features of the different embodiments as described above can be suitably combined. More precisely, it is possible to combine the features of two or more of the above embodiments.

While the invention has been described with respect to a ski carrier and ski carrier clamp for carrying winter sport equipment such as ski or snowboard, it is to be noted that the carrier according to the invention can also be implemented as SUP (stand-up paddle board) or surfboard carrier although the carrier is described as ski carrier. In other words, the ski carrier clamp can also be embodied as snowboard, SUP or surfboard carrier clamp.

The invention as disclosed also relates to a ski carrier clamp as presented in clause structure in the following:

1. Ski carrier clamp 1 mountable on a cross bar of a vehicle roof carrier, the ski carrier clamp 1 comprising an elongate base part 2 and an elongate top part 4 wherein a first end portion 21 of said elongate base part 2 is hingedly coupled to a first end portion 41 of said elongate top part 4 by means of a hinge mechanism 6, said hinge mechanism 6 comprising a guiding portion 61 in which a guided element 62 is slidably guided such that said first end portion 41 of said elongate top part 4 and said first end portion 21 of said elongate base part 2 are movable with respect to each other.
2. Ski carrier clamp 1 according to clause 1, wherein said first end portion 41 of said elongate top part 4 and said first end portion 21 of said elongate base part 2 are movable with respect to each other in a direction substantially perpendicular to the longitudinal direction of the elongate base part 2.
3. Ski carrier clamp 1 according to clause 1 or 2, wherein said guided element 62 is movable between a retracted position in which said first end portion 41 and said second end portion 22 are closest to each other and a deployed position and wherein said guided element 62 is biased towards said retracted position by means of a biasing means 63.
4. Ski carrier clamp 1 according to clause 3, wherein said biasing means 63 is a spring accommodated in a recess 62a of said guided element 62 and cooperating with an abutment portion of said guiding portion 61 such that it is compressed upon movement of the guided element 62 towards the deployed position.
5. Ski carrier clamp according to one of the preceding clauses, wherein said guided element 62 comprises a supporting portion 62b for hingedly supporting a supported element about a hinge axis h, said supported element being said elongate base part 2 or said elongate top part 4.
6. Ski carrier clamp according to clause 5, further comprising an urging means 64, preferably a spring, for exerting an urging force on said supported element for urging said supported element about said hinge axis h.
7. Ski carrier clamp according to clause 6, wherein said urging means 64 is force transmittingly and slidably supported on a supporting surface 61a of said guiding portion 61 at a first section thereof, and force transmittingly connected to the supported element at a second section thereof such that a force received by said guided element 62 from said urging means 64 is minimized.
8. Ski carrier clamp according to clause 7, wherein said urging means 64 is a torsion spring wound around said hinge axis h and comprises a first free end 64a slidably accommodated in said guiding portion 61 and a second end 64b fixedly coupled to said supported element.
9. Ski carrier clamp 1 mountable on a cross bar of a vehicle roof carrier, the ski carrier clamp 1 comprising an elongate base part 2 and an elongate top part 4 wherein a first end portion 21 of said elongate base part 2 is hingedly coupled to a first end portion 41 of said elongate top part 4 by means of a hinge mechanism 6, said hinge mechanism preferably being a hinge mechanism according to one of the preceding clauses, and wherein a second end portion 22 of said elongate base part 2 is releasably lockable to a second end portion 42 of said elongate top part 4 by means of a locking mechanism 7,
said locking mechanism 7 comprising a flexible locking wire 71 fixedly coupled to one of the elongate base part 2 and the elongate top part 4 for direct force transmission at a coupling portion 71a thereof and engageable with a locking portion 26 of the other one of the elongate top part 4 and the elongate base part 2, respectively, at an engaging portion 71b thereof.
10. Ski carrier clamp 1 according to clause 9, wherein said flexible locking wire is a locking spring which is pretensioned so as to bias said engaging portion 71b in a locking direction.
11. Ski carrier clamp 1 according to one of clauses 9 and 10, wherein said locking portion 26 comprises one or multiple recesses 26a for accommodating said engaging portion 71b, is preferably made of metal and preferably directly attached to said elongate base part 2 and said elongate top part 4, respectively.
12. Ski carrier clamp 1 according to one of clauses 9 to 11, further comprising a release member 72 for moving said engaging portion 71b in a disengaging direction, said release member 72 being arranged rotatably about an axis p, wherein said locking wire 71 is wound around said axis p at a coil portion 71c thereof.
13. Ski carrier clamp 1 according to clause 12, wherein said release member 72 further comprises a supporting section 72a which at least partially supports said flexible wire 71, said supporting section 72a extending in a direction radially from said axis p such that said flexible wire 71 is at least partially supported between said coil portion 71c and said engaging portion 71b wherein said supporting section 72a preferably comprises a groove for accommodating said flexible wire 71.
14. Ski carrier clamp 1 according to clause 13, wherein said elongate base part 2 and said elongate top part 4 are hollow profiles and wherein said coupling portion 71a is fixedly held against an inner wall of one of said hollow profiles, preferably over a length of at least 20 mm.

15. Ski carrier clamp according to one of clauses 9 to 14 comprising a hinge mechanism 6 as described in one of clauses 1 to 8.

Furthermore, the invention relates to a ski carrier clamp as described in clause structure in the following:

A) Ski carrier clamp 1 mountable on a cross bar of a vehicle roof carrier, the ski carrier clamp 1 comprising an elongate base part 2 carrying a first flexible clamp member 3 extending in the longitudinal direction of the elongate base part 2,
an elongate top part 4 having a second flexible clamp member 5 extending in the longitudinal direction of the elongate top part 4,
wherein said elongate top part 4 is movably coupled to the elongate base part 2 so that said second flexible clamp member 5 is movable with respect to said first flexible clamp member 3,
and wherein said first flexible clamp member 3 and said second flexible clamp member 5 are arranged such that at least portions thereof are able to laterally pass each other upon moving said elongate base part 2 and said elongate top part 4 towards each other.

B) Ski carrier clamp 1 according to clause A), wherein a substantial portion of said first and/or second flexible clamp members 3, 5 is offset in a transverse direction of the elongate base part 2 and the elongate to part 3, respectively.

C) Ski carrier clamp 1 according to clause A) or B), wherein
an overall outer contour of a cross section in a direction perpendicular to the longitudinal directions of at least one of said flexible clamp members 3, 5 in combination with the respective elongate part 2, 4 on which it is carried has an asymmetric shape, preferably arising from an asymmetry of the flexible clamp members 3, 5.

D) Ski carrier clamp (1) according to one of the preceding clauses A) to C), wherein
said first flexible clamp member 3 comprises a first base portion 3a adapted to contact said elongate base part 2 and a first protruding portion 3b arranged on and protruding from said first base portion 3a and/or said second flexible clamp member 5 comprises a second base portion 5a adapted to contact said elongate top part 4 and a second protruding portion 5b arranged on and protruding from said second base portion 5a.

E) Ski carrier clamp according to clause D), wherein said first protruding portion 3b and/or said second protruding portion 5b comprise a laterally outer wall 3c, 5c provided in the area of the lateral end of said elongate base part 2 and said elongate top part 4, respectively, said laterally outer wall 3c, 5c preferably extending substantially perpendicular with respect to an extension direction of said first base portion 3a and said second base portion 5a, respectively, and preferably comprising a greater wall thickness than other walls of the respective flexible clamp member 3, 5.

F) Ski carrier according to clauses D) or E), wherein said first protruding portion 3b and said second protruding portion 5b are formed with a similar shape, preferably with a cross section having the shape of a truncated triangle, a frustoconical cross section, or an essentially triangular cross section.

G) Ski carrier clamp according to clause F), wherein said first and second flexible clamp members 3, 5 are arranged on said elongate base part 2 and said elongate top part 4, respectively, in an inversed manner.

H) Ski carrier according to one of clauses A) to G), wherein at least one protruding portion 3b, 5b comprises an interior structure which in cross section comprises at least two hollow spaces 3d, 5d and at least one interior wall 3e, 5e separating said hollow spaces 3d, 5d.

I) Ski carrier according to clause H), wherein said at least one interior wall 3e, 5e and said hollow spaces 3d, 5d form a deformation pattern allowing said laterally outer walls 3c, 5c of said protruding portion 3b, 5b to bulge laterally outward when said protruding portion 3b, 5b is compressed in a direction substantially perpendicular to said base portion 3a, 5a.

J) Elongate base part 2 for a ski carrier clamp 1, said elongate base part 2 comprising a mounting recess 23 for accommodating a mounting means for mounting said elongate base part 2 to a cross bar of a vehicle roof carrier and a mounting structure 24 for coupling a first flexible clamp member 3 to said elongate base part 2 such that the first flexible clamp member 3 is movable between a non-access position in which said first flexible clamp member 3 obstructs access to said mounting recess 23 and an access position in which access to said mounting recess 23 is possible.

K) Elongate base part 2 according to clause J), wherein said mounting structure comprises an attaching recess 24 for fixedly coupling a mounting portion 3f of the first flexible clamp member 3 to the elongate base part 2, wherein said attaching recess 24 preferably extends in the longitudinal direction of the elongate base part 2.

L) Elongate base part 2 according to clause J) or K), wherein said first flexible clamp member 3 is hingedly coupled, preferably pivotally coupled, to said elongate base part 2 at a mounting portion 3f thereof and is movable from said non-access position into said access position by swivelling movement about said mounting portion 3f M) Elongate base part 2 according to clause L), wherein said first flexible clamp member 3 is at least partially flexibly deformed upon movement from said use position to said mounting position preferably at least at a deformation portion 3g thereof, said deformation portion 3g allowing a defined movement of said first flexible clamp member 3.

N) Elongate base part 2 according to clause L), wherein said first flexible clamp member 3 further comprises an engaging portion 3h releasably engageable with an engaging means 25 of said elongate base part 2, said engaging portion 3h being preferably formed as an engaging hook and said engaging means 25 being preferably formed as an engaging recess for lockably receiving said engaging portion 3h.

O) Ski carrier clamp (1) according to one of clauses A) to I) comprising an elongate base part (2) according to one of clauses J) to N).

The invention claimed is:

1. A ski carrier clamp mountable on a cross bar of a vehicle roof carrier, the ski carrier clamp comprising:
an elongate base part having a first end portion and a second end portion;
an elongate top part having a first end portion and a second end portion; and
a hinge mechanism comprising a guiding portion coupled to the elongate base part and a guided element slidably disposed in the guiding portion, wherein the hinge mechanism couples the first end portion of the elongate base part to the first end portion of the elongate top part, and wherein the first end portion of the elongate base part and the first end portion of the elongate top part are configured to move with respect to each other.

2. The ski carrier clamp of claim 1, wherein the first end portion of the elongate top part is configured to move in a direction substantially perpendicular to a longitudinal direction of the elongate base part.

3. The ski carrier clamp of claim 1, wherein the guided element is slidable between a retracted position and a deployed position, wherein in the first end portion of the elongate base part and the first end portion of the elongate top part are spaced farther apart in the deployed position than in the retracted position.

4. The ski carrier clamp of claim 3, further comprising a first biasing element configured to bias the guided element towards the retracted position.

5. The ski carrier clamp of claim 4, wherein the biasing element is a spring disposed in a recess of the guided element.

6. The ski carrier clamp of claim 5, wherein the spring engages an abutment portion of the guiding portion so that the spring is compressed when in the deployed position.

7. The ski carrier clamp of claim 3, wherein the guided element comprises a supporting portion configured to hingedly support a supported element about a hinge axis, wherein the supported element is one of the elongate top part or the elongate base part.

8. The ski carrier clamp of claim 7, further comprising a second biasing element configured to exert a force on the supported element to bias the supported element about the hinge axis.

9. The ski carrier clamp of claim 8, wherein the second biasing element is a torsion spring wound around the hinge axis, the torsion spring comprising a free end slidably disposed in the guiding portion and a second end fixedly coupled to the supported element.

10. The ski carrier clamp of claim 1, wherein the hinge mechanism further comprises a pin that hingedly couples the elongate top part to the guided element.

11. A ski carrier clamp mountable on a cross bar of a vehicle roof carrier, the ski carrier clamp comprising:
an elongate base part having a first end portion and a second end portion;
an elongate top part having a first end portion and a second end portion; and
a locking mechanism configured to releasably lock the second end portion of the elongate base part to the second end portion of the elongate top part, the locking mechanism comprising a locking wire, a coupling portion, a locking portion, and an engaging portion,
wherein the first end portion of the elongate base part is coupled to the first end portion of the elongate top part,
wherein the locking wire is coupled to the elongate base part or the elongate top part and configured to engage the locking portion of the locking mechanism, and
wherein the elongate base part and the elongate top part are configured to move with respect to each other.

12. The ski carrier clamp of claim 11, wherein the locking wire comprises a locking spring that is pretensioned and configured to bias the engaging portion in a locking direction.

13. The ski carrier clamp of claim 11, wherein the locking portion further comprises a plurality of engaging recesses defined by a plurality of teeth.

14. The ski carrier clamp of claim 13, wherein the engaging portion is configured to engage at least one of the engaging recesses.

15. The ski carrier clamp of claim 11, wherein the locking mechanism further comprises a release member disposed rotatably about an axis, wherein the release member is configured to move the engaging portion in a disengaging direction.

16. The ski carrier clamp of claim 15, wherein the release member comprises a supporting section configured to at least partially support the locking wire, the supporting section extending in a direction radially from the axis such that the locking wire is at least partially supported between a coil portion of the locking mechanism and the engaging portion.

17. The ski carrier clamp of claim 16, wherein the supporting section comprises a groove configured to receive the locking wire.

18. The ski carrier clamp of claim 15, wherein the release member is a push button rotatably mounted about the axis.

19. The ski carrier clamp of claim 12, wherein:
the coupling portion is coupled to the elongate top part and extends in the longitudinal direction of the elongate top part;
the locking portion is coupled to the elongate base part; and
the engaging portion is disposed between the locking spring and the locking portion and releasably engagable with the locking portion.

20. A ski carrier clamp mountable on a cross bar of a vehicle roof carrier, the ski carrier clamp comprising:
an elongate base part having a first end portion and a second end portion;
an elongate top part having a first end portion and a second end portion; and
a hinge mechanism comprising a guiding portion coupled to the elongate base part and a guided element slidably disposed in the guiding portion; and
a locking mechanism configured to releasably lock the second end portion of the elongate base part to the second end portion of the elongate top part, the locking mechanism comprising a flexible locking wire, a coupling portion, a locking portion, and an engaging portion,
wherein the hinge mechanism couples the first end portion of the elongate base part to the first end portion of the elongate top part,
wherein the first end portion of the elongate base part and the first end portion of the elongate top part are configured to move with respect to each other, and
wherein the flexible locking wire is fixedly coupled to one of the elongate base part or the elongate top part and configured to engage the locking portion of the locking mechanism.

* * * * *